United States Patent
Yokota

(10) Patent No.: US 11,538,636 B2
(45) Date of Patent: Dec. 27, 2022

(54) MULTILAYER CERAMIC ELECTRONIC COMPONENT AND METHOD OF PRODUCING MULTILAYER CERAMIC ELECTRONIC COMPONENT

(71) Applicant: Murata Manufacturing Co., Ltd., Nagaokakyo (JP)

(72) Inventor: Yusuke Yokota, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/076,846

(22) Filed: Oct. 22, 2020

(65) Prior Publication Data

US 2021/0134530 A1 May 6, 2021

(30) Foreign Application Priority Data

Oct. 30, 2019 (JP) .............................. JP2019-197781

(51) Int. Cl.
*H01G 4/30* (2006.01)
*H01G 4/12* (2006.01)
*H01G 4/012* (2006.01)
*H01G 4/248* (2006.01)

(52) U.S. Cl.
CPC ............... *H01G 4/30* (2013.01); *H01G 4/012* (2013.01); *H01G 4/12* (2013.01); *H01G 4/248* (2013.01)

(58) Field of Classification Search
CPC ............ H01G 4/30; H01G 4/012; H01G 4/12; H01G 4/248
See application file for complete search history.

(56) References Cited

U.S. PATENT DOCUMENTS

| | | | | |
|---|---|---|---|---|
| 10,304,626 | B2 * | 5/2019 | Ueda | H01G 4/224 |
| 10,923,279 | B2 * | 2/2021 | Fukunaga | H01G 4/224 |
| 11,011,308 | B2 * | 5/2021 | Takagi | H01G 4/1236 |
| 11,094,462 | B2 * | 8/2021 | Fukunaga | H01G 4/224 |
| 11,232,907 | B2 * | 1/2022 | Teraoka | H01G 4/232 |
| 11,239,030 | B2 * | 2/2022 | Hashimoto | H01G 4/30 |

(Continued)

FOREIGN PATENT DOCUMENTS

| | | |
|---|---|---|
| JP | 09-320887 A | 12/1997 |
| JP | 2017-011172 A | 1/2017 |

(Continued)

*Primary Examiner* — Dion R. Ferguson
(74) *Attorney, Agent, or Firm* — Keating & Bennett, LLP

(57) ABSTRACT

A multilayer ceramic electronic component includes a laminate including dielectric ceramic layers and at least a pair of internal electrode layers laminated together, the laminate including a pair of main surfaces that oppose each other in a lamination direction, a pair of side surfaces that oppose each other in a width direction perpendicular or substantially perpendicular to the lamination direction, and a pair of end surfaces that oppose each other in a length direction perpendicular or substantially perpendicular to the lamination direction and the width direction, a pair of side surface layers respectively provided on the side surfaces of the laminate, a pair of main surface layers covering interfaces between the laminate and the side surface layers respectively provided on the main surfaces of the laminate, and a pair of external electrodes respectively connected to the internal electrode layers respectively provided on the end surfaces of the laminate.

17 Claims, 11 Drawing Sheets

(56) References Cited

U.S. PATENT DOCUMENTS

| | | | |
|---|---|---|---|
| 2014/0301013 A1* | 10/2014 | Kim | H01G 4/01 |
| | | | 361/301.4 |
| 2016/0126014 A1* | 5/2016 | Lee | H01G 4/30 |
| | | | 361/301.4 |
| 2016/0196918 A1* | 7/2016 | Hong | H01G 4/232 |
| | | | 174/260 |
| 2017/0018363 A1* | 1/2017 | Tanaka | H01G 4/005 |
| 2017/0154733 A1* | 6/2017 | Lee | H01G 4/012 |
| 2018/0102217 A1 | 4/2018 | Fukunaga | |
| 2018/0108480 A1 | 4/2018 | Fujii et al. | |
| 2018/0315549 A1* | 11/2018 | Ueda | H01G 4/012 |
| 2019/0035554 A1* | 1/2019 | Inomata | H01G 4/30 |
| 2019/0371525 A1* | 12/2019 | Zaima | H01G 4/232 |
| 2019/0385794 A1* | 12/2019 | Yanagisawa | H01G 4/0085 |
| 2020/0035415 A1* | 1/2020 | Kwon | H01G 4/224 |
| 2020/0075259 A1* | 3/2020 | Park | H01G 4/224 |
| 2020/0126724 A1* | 4/2020 | Takagi | H01G 4/30 |
| 2020/0152381 A1* | 5/2020 | Matsushita | H01G 4/30 |
| 2021/0012968 A1* | 1/2021 | Taniguchi | H01G 4/012 |
| 2021/0098191 A1* | 4/2021 | Saito | H01G 4/232 |
| 2021/0134530 A1* | 5/2021 | Yokota | H01G 4/12 |
| 2021/0166882 A1* | 6/2021 | Nishiura | H01G 4/1209 |

FOREIGN PATENT DOCUMENTS

| | | |
|---|---|---|
| JP | 2017-147358 A | 8/2017 |
| JP | 2018-067562 A | 4/2018 |
| KR | 10-2018-0040078 A | 4/2018 |
| KR | 10-2018-0067482 A | 6/2018 |

* cited by examiner

MULTILAYER CERAMIC ELECTRONIC COMPONENT AND METHOD OF PRODUCING MULTILAYER CERAMIC ELECTRONIC COMPONENT

CROSS REFERENCE TO RELATED APPLICATIONS

This application claims the benefit of priority to Japanese Patent Application No. 2019-197781 filed on Oct. 30, 2019. The entire contents of this application are hereby incorporated herein by reference.

BACKGROUND OF THE INVENTION

1. Field of the Invention

The present invention relates to a multilayer ceramic electronic component and a method of producing a multilayer ceramic electronic component.

2. Description of the Related Art

Multilayer ceramic electronic components such as multilayer ceramic capacitors have been reduced in size and increased in capacity in recent years. In order to reduce the size and increase the capacity of multilayer ceramic capacitors, it is effective to reduce the thickness of the side margin on each side surface of a laminate in which dielectric ceramic layers and internal electrode layers are laminated, and thereby increase the area of the internal electrode layers that oppose each other.

JP 2017-147358 A discloses a method of producing an electronic component, including: a step of preparing a chip including a plurality of dielectric layers and a plurality of internal electrode layers laminated together, the internal electrode layers being exposed on side surfaces; a step of bonding a plurality of covering dielectric sheets to each other to form dielectric laminate sheets; and a step of bonding the dielectric laminate sheets to the respective side surfaces of the chip.

The method of producing a multilayer ceramic electronic component as described in JP 2017-147358 A includes stacking and compression bonding dielectric ceramic layers and internal electrode layers to produce a laminate, followed by formation of side surface layers defining side margins on the side surfaces of the laminate. Firing such a laminate including the side surface layers, however, may unfortunately cause the side surface layers to peel from the laminate due to the difference in shrinkage rate between the dielectric ceramic layers and the internal electrode layers in the laminate.

The above problem is not only for multilayer ceramic capacitors but is common for multilayer ceramic electronic components including multilayer ceramic inductors.

SUMMARY OF THE INVENTION

Preferred embodiments of the present invention provide multilayer ceramic electronic components in each of which side surface layers tend not to peel from a laminate. Preferred embodiments of the present invention also provide methods of producing multilayer ceramic electronic components.

A multilayer ceramic electronic component according to a preferred embodiment of the present invention includes a laminate including a plurality of dielectric ceramic layers and at least a pair of internal electrode layers laminated together, the laminate including a pair of main surfaces that oppose each other in a lamination direction, a pair of side surfaces that oppose each other in a width direction perpendicular or substantially perpendicular to the lamination direction, and a pair of end surfaces that oppose each other in a length direction perpendicular or substantially perpendicular to the lamination direction and the width direction; a pair of side surface layers respectively provided on the side surfaces of the laminate; a pair of main surface layers covering interfaces between the laminate and the side surface layers respectively provided on the main surfaces of the laminate; and a pair of external electrodes respectively connected to the internal electrode layers respectively provided on the end surfaces of the laminate.

A method of producing a multilayer ceramic electronic component according to a preferred embodiment of the present invention includes preparing a laminate including a plurality of dielectric ceramic layers and at least a pair of internal electrode layers laminated together, the laminate including a pair of main surfaces that oppose each other in a lamination direction, a pair of side surfaces that oppose each other in a width direction perpendicular or substantially perpendicular to the lamination direction, and a pair of end surfaces that oppose each other in a length direction perpendicular or substantially perpendicular to the lamination direction and the width direction; forming a pair of side surface layers, respectively, on the side surfaces of the laminate; forming a pair of main surface layers covering interfaces between the laminate and the side surface layers, respectively, on the main surfaces of the laminate; and forming a pair of external electrodes respectively connected to the internal electrode layers respectively provided on the end surfaces of the laminate.

The preferred embodiments of the present invention provide multilayer ceramic electronic components in which side surface layers tend not to peel from a laminate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to preferred embodiments of the present invention are described below.

The present invention is not limited to the following preferred embodiments, and may be suitably modified without departing from the gist of the present invention. Combinations of two or more preferred features described in the following preferred embodiments are also within the scope of the present invention.

The following preferred embodiments are examples, and features of different preferred embodiments may be partially exchanged or combined with each other. In the second preferred embodiment and subsequent preferred embodiments, a description of features common to the first preferred embodiment is omitted, and only different points are described. In particular, similar advantageous effects by similar features are not described in each preferred embodiment.

A multilayer ceramic capacitor is described as a preferred embodiment of the multilayer ceramic electronic component of the present invention. The concepts of preferred embodiments of the present invention are also applicable to multilayer ceramic electronic components other than the multilayer ceramic capacitor. Examples of such multilayer ceramic electronic components include inductors, piezoelectric elements, and thermistors.

Figure 1:
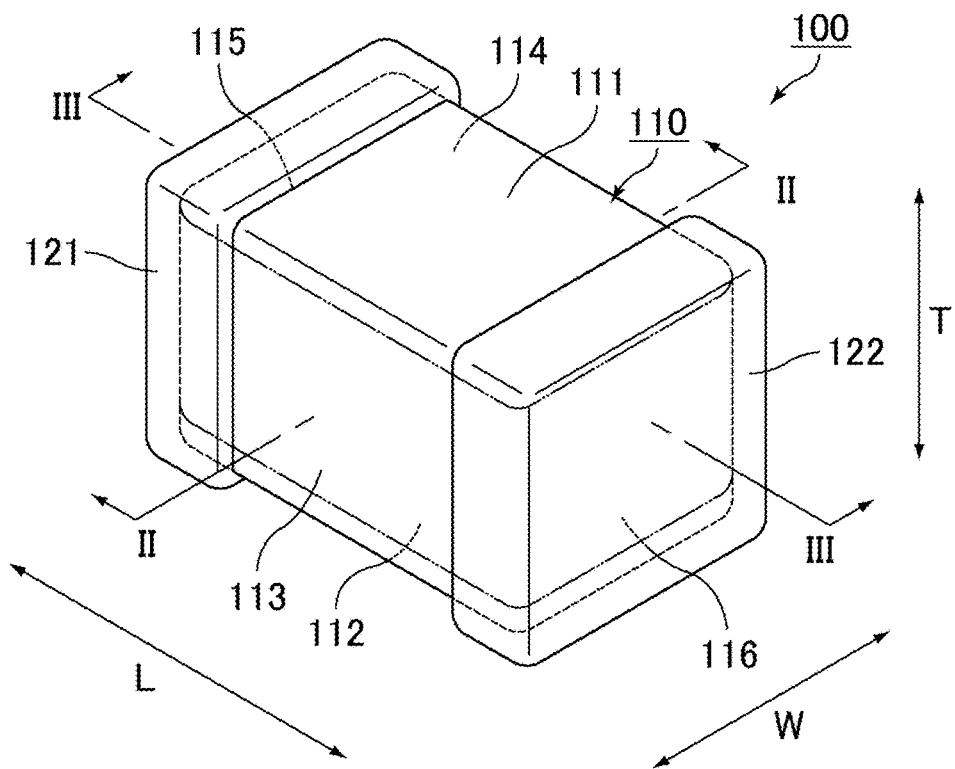
FIG. 1 is a perspective view showing an example multilayer ceramic capacitor according to a first preferred embodiment of the present invention.
Figure 2:
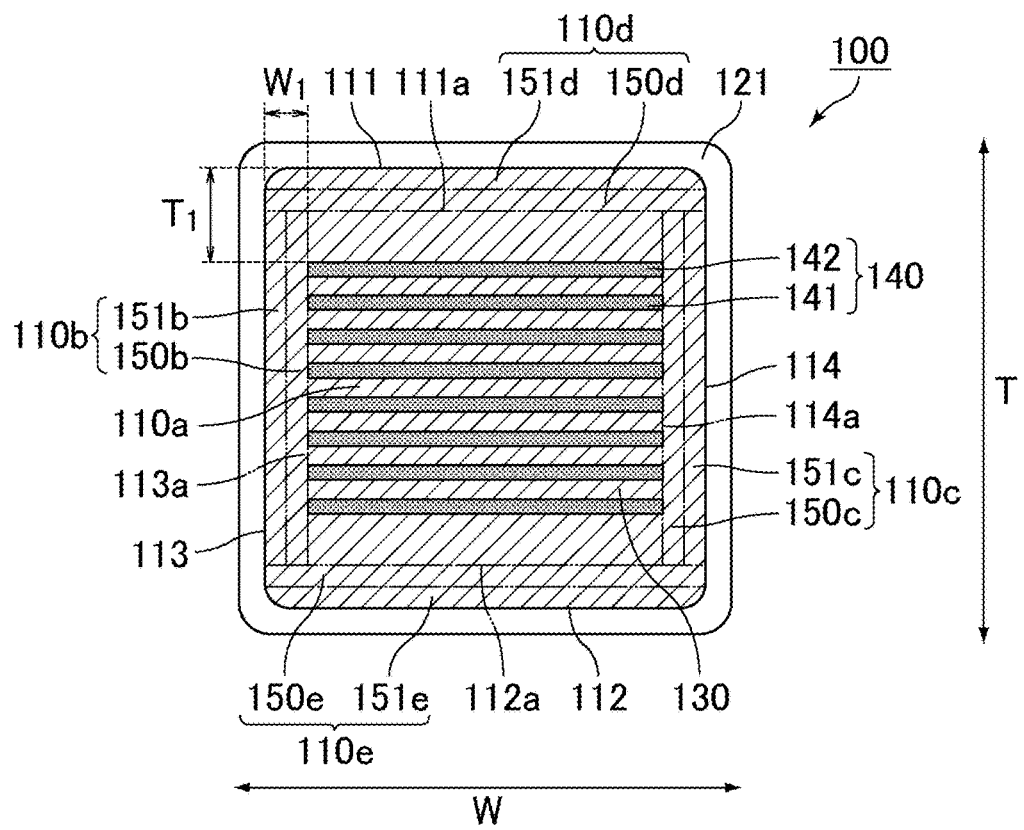
FIG. 2 is a cross-sectional view taken along the line II-II of the multilayer ceramic capacitor shown in FIG. 1.
Figure 3:
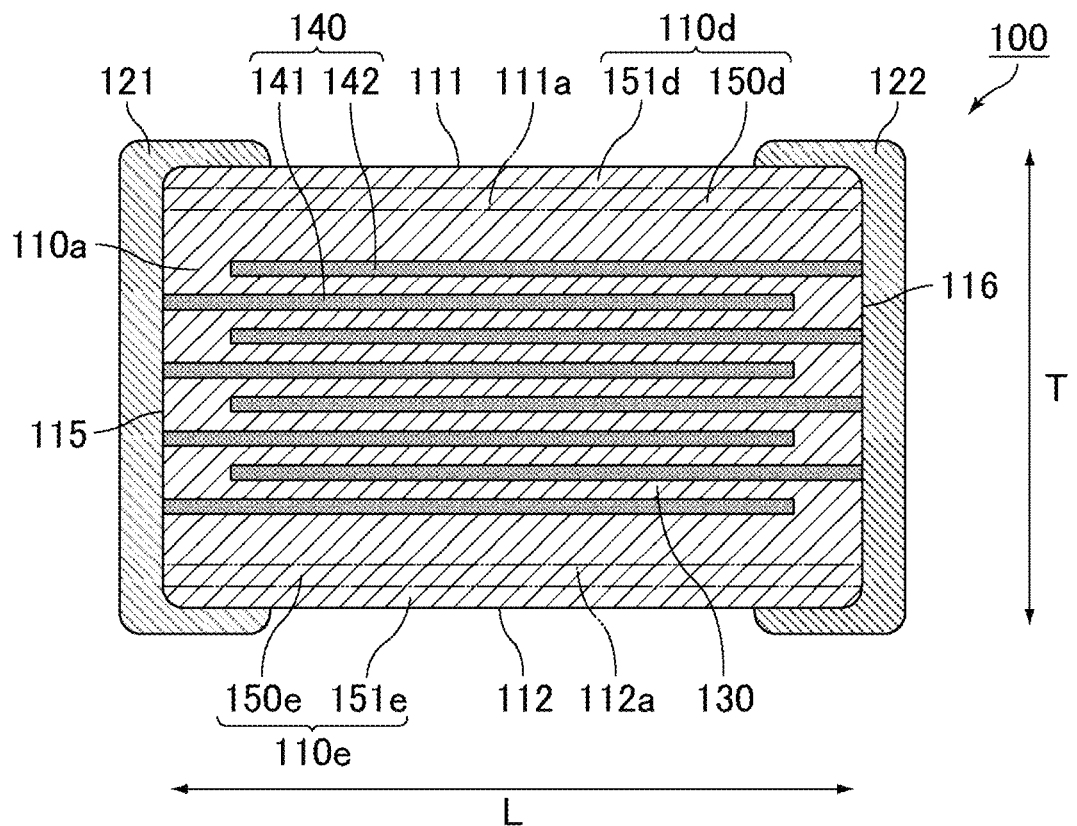
FIG. 3 is a cross-sectional view taken along the line III-III of the multilayer ceramic capacitor shown in FIG. 1.
Figure 4:
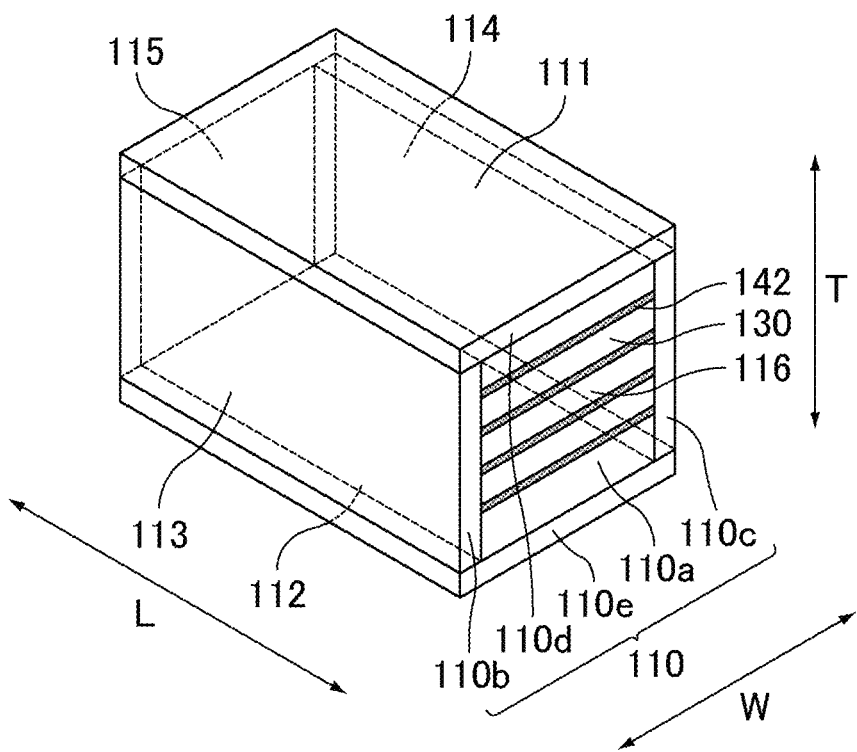
FIG. 4 is a perspective view showing the appearance of a component body defining the multilayer ceramic capacitor shown in FIG. 1.
Figure 5:
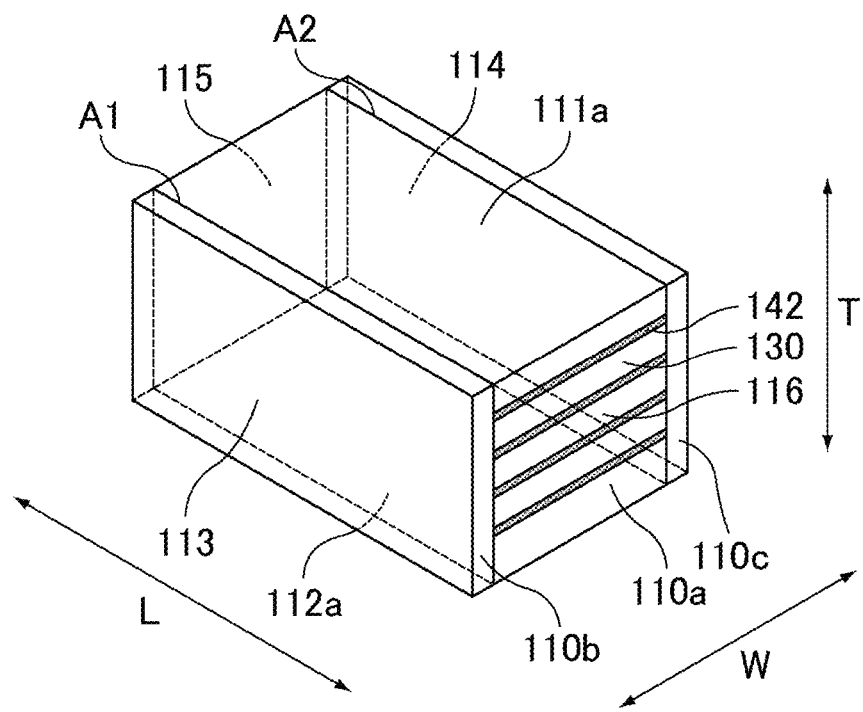
FIG. 5 is a perspective view showing the structures of a laminate and a side surface layer in the component body shown in FIG. 4.
Figure 6:
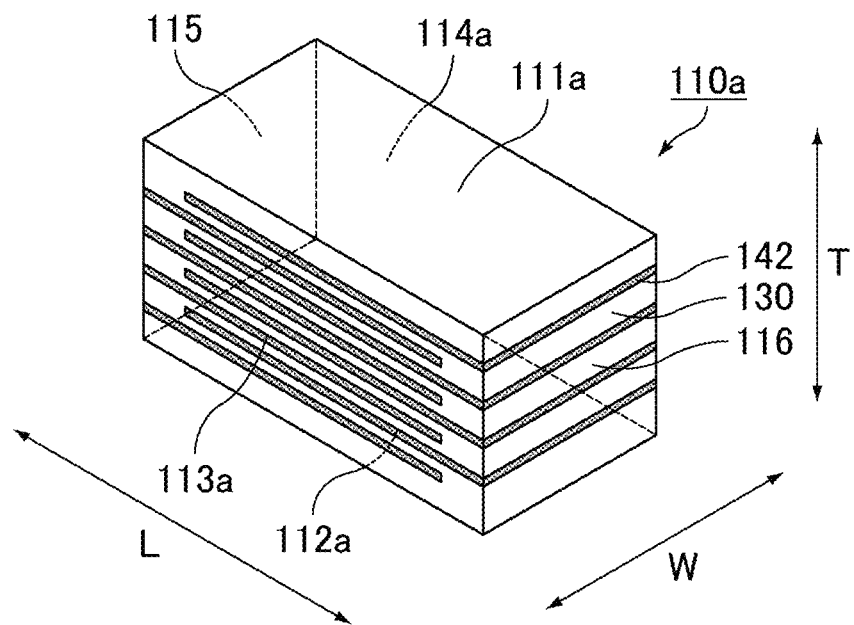
FIG. 6 is a perspective view showing the structure of the laminate in the component body shown in FIG. 4.

FIG. 1 is a perspective view showing an example multilayer ceramic capacitor according to a first preferred embodiment of the present invention. FIG. 2 is a cross-sectional view taken along the line II-II of the multilayer ceramic capacitor shown in FIG. 1. FIG. 3 is a cross-sectional view taken along the line III-III of the multilayer ceramic capacitor shown in FIG. 1. FIG. 4 is a perspective view showing the appearance of a component body defining the multilayer ceramic capacitor shown in FIG. 1. FIG. 5 is a perspective view showing the structures of a laminate and a side surface layer in the component body shown in FIG. 4. FIG. 6 is a perspective view showing the structure of the laminate in the component body shown in FIG. 4. In FIG. 1 to FIG. 6, the length direction of a laminate is indicated by L, the width direction thereof is indicated by W, and the lamination direction thereof is indicated by T.

A multilayer ceramic capacitor 100 shown in FIG. 1 includes a component body 110, a first external electrode 121, and a second external electrode 122.

As shown in FIG. 4, the component body 110 is a rectangular or substantially rectangular cuboid. The component body 110 includes a first main surface 111 and a second main surface 112 that oppose each other in the lamination direction T, a first side surface 113 and a second side surface 114 that oppose each other in the width direction W perpendicular or substantially perpendicular to the lamination direction T, and a first end surface 115 and a second end surface 116 that oppose each other in the length direction L perpendicular or substantially perpendicular to the lamination direction T and the width direction W.

In the component body 110, which is a substantially rectangular cuboid as described above, preferably, corners and ridges are rounded, for example. The corner is a portion where three faces of the component body 110 meet, and the ridge is a portion where two faces of the component body 110 meet. At least one of the first main surface 111, the second main surface 112, the first side surface 113, the second side surface 114, the first end surface 115, or the second end surface 116 may be uneven.

As shown in FIG. 4, the component body 110 includes a laminate 110a, a first side surface layer 110b, a second side surface layer 110c, a first main surface layer 110d, and a second main surface layer 110e.

As shown in FIG. 2 and FIG. 3, the laminate 110a includes dielectric ceramic layers 130 and pairs of internal electrode layers 140 laminated together. The laminate 110a also includes a first main surface 111a and a second main surface 112a that oppose each other in the lamination direction T, a first side surface 113a and a second side surface 114a that oppose each other in the width direction W perpendicular or substantially perpendicular to the lamination direction T, and a first end surface 115 and a second end surface 116 that oppose each other in the length direction L perpendicular or substantially perpendicular to the lamination direction T and the width direction W.

As shown in FIG. 5 and FIG. 6, the first side surface layer 110b is on the first side surface 113a of the laminate 110a and defines the first side surface 113 of the component body 110 shown in FIG. 4. The second side surface layer 110c is on the second side surface 114a of the laminate 110a and defines the second side surface 114 of the component body 110 shown in FIG. 4.

As shown in FIG. 4 and FIG. 5, the first main surface layer 110d is on the first main surface 111a of the laminate 110a and defines the first main surface 111 of the component body 110 shown in FIG. 4. The second main surface layer 110e is on the second main surface 112a of the laminate 110a and defines the second main surface 112 of the component body 110 shown in FIG. 4.

The first main surface layer 110d covers an interface A1 (see FIG. 5) between the laminate 110a and the first side surface layer 110b and an interface A2 (see FIG. 5) between the laminate 110a and the second side surface layer 110c. Similarly, the second main surface layer 110e covers the interface A1 between the laminate 110a and the first side surface layer 110b and the interface A2 between the laminate 110a and the second side surface layer 110c.

Firing the component body 110 may cause the first side surface layer 110b and the second side surface layer 110c to peel from the laminate 110a at the interface A1 between the laminate 110a and the first side surface layer 110b and the interface A2 between the laminate 110a and the second side surface layer 110c due to the difference in shrinkage rate between the dielectric ceramic layers 130 and the internal electrode layers 140 in the laminate 110a, as described above. However, the first main surface layer 110d and the second main surface layer 110e covering the interfaces A1 and A2 reduce the chances for the first side surface layer 110b and the second side surface layer 110c to peel from the laminate 110a. Moreover, the first main surface layer 110d and the second main surface layer 110e, when having a material composition that easily causes shrinkage, may compress the component body 110 from both sides in the lamination direction T during firing.

Hereinafter, the first side surface layer and the second side surface layer are each referred to simply as a "side surface layer" when no distinction is made therebetween. Similarly, the first main surface layer and the second main surface layer are each simply referred to as a "main surface layer" when no distinction is made therebetween.

The side surface layers 110b and 110c and the main surface layers 110d and 110e include a perovskite compound including Ba or Ti, for example. The side surface layers 110b and 110c and the main surface layers 110d and 110e may include a dielectric ceramic mainly including a compound such as $BaTiO_3$, $CaTiO_3$, $SrTiO_3$, or $CaZrO_3$. A material is also usable which includes any of the above main compounds and an accessory compound such as a Mn compound, a Mg compound, a Si compound, a Fe compound, a Cr compound, a Co compound, a Ni compound, an Al compound, a V compound, or a rare earth compound.

The side surface layers 110b and 110c and the main surface layers 110d and 110e each preferably include a ceramic layer having the same or similar material composition, for example. This is likely to integrate the side surface layers 110b or 110c and the main surface layers 110d or 110e, reducing structural defects.

Here, "the same or similar material composition" means that the types of elements included in the dielectric ceramic defining each ceramic layer are the same or similar. The amounts of the elements may be different as long as the types of elements included in the dielectric ceramic defining each ceramic layer are the same or similar. However, in order to reduce the structural defects, the amounts of the elements are preferably the same or substantially the same, for example. The types and amounts of elements included in each ceramic layer are able to be determined by exposing a cross section extending in the width direction W and the lamination direction T at substantially the center in the length direction L of the multilayer ceramic capacitor, and subjecting the cross sections to elemental analysis by wavelength-dispersive X-ray spectroscopy (WDX).

The first side surface layer 110b preferably has, for example, as shown in FIG. 2, a two-layer structure including a first inner side surface layer 150b in contact with the laminate 110a and a first outer side surface layer 151b on the outer surface of the first inner side surface layer 150b.

The second side surface layer 110c preferably has, for example, as shown in FIG. 2, a two-layer structure including a second inner side surface layer 150c in contact with the laminate 110a and a second outer side surface layer 151c on the outer surface of the second inner side surface layer 150c.

The first side surface layer 110b and the second side surface layer 110c may each have a structure other than the two-layer structure, for example, a one-layer structure or a three or more-layer structure. In a three or more-layer structure, the side surface layer in contact with the laminate 110a corresponds to the inner side surface layer and the side surface layer defining the outermost layer of the component body 110 corresponds to the outer side surface layer. The first side surface layer 110b and the second side surface layer 110c may include different numbers of layers.

When the first side surface layer 110b and the second side surface layer 110c each have a two-layer structure, observation of these side surface layers by dark-field observation under an optical microscope is able to confirm that the structure is a two-layer structure because the inner side surface layer and the outer side surface layer have different sinterability. The first side surface layer 110b and the second side surface layer 110c, each having a three or more-layer structure, are able to be similarly confirmed by observation.

The inner side surface layer is a side surface layer provided with a focus on the adhesion to the laminate. The outer side surface layer is a side surface layer provided with a focus on the environment resistance, for example, denseness. In order to provide these properties, the inner side surface layer is preferably different from the outer side surface layer in amount of materials, for example. Specifically, in formation of the inner side surface layer and the outer side surface layer, the amount of a binder resin used for the inner side surface layer is preferably larger than that for the outer side surface layer, for example. Accordingly, the outer side surface layer is denser than the inner side surface layer. The difference in density between the inner side surface layer and the outer side surface layer is able to be confirmed by observation of their polished cross sections with an electron microscope.

The first main surface layer 110d preferably has, for example, as shown in FIG. 2 and FIG. 3, a two-layer structure including a first inner main surface layer 150d in contact with the laminate 110a and a first outer main surface layer 151d on the outer surface of the first inner main surface layer 150d.

The second main surface layer 110e preferably has, for example, as shown in FIG. 2 and FIG. 3, a two-layer structure including a second inner main surface layer 150e in contact with the laminate 110a and a second outer main surface layer 151e on the outer surface of the second inner main surface layer 150e.

The first main surface layer 110d and the second main surface layer 110e may each have a structure other than the two-layer structure, for example, a one-layer structure or a three or more-layer structure. In a three or more-layer structure, the main surface layer in contact with the laminate 110a corresponds to the inner main surface layer and the main surface layer defining the outermost layer of the component body 110 corresponds to the outer main surface layer. The first main surface layer 110d and the second main surface layer 110e may include different numbers of layers.

When the first main surface layer 110d and the second main surface layer 110e each have a two-layer structure, observation of these main surface layers by dark-field observation under an optical microscope is able to confirm that the structure is a two-layer structure because the inner main surface layer and the outer main surface layer have different sinterability. The first main surface layer 110d and the second main surface layer 110e, each having a three or more-layer structure, are able to be similarly confirmed by observation.

The inner main surface layer is a main surface layer provided with a focus on the adhesion to the laminate. The outer main surface layer is a main surface layer provided with a focus on the environment resistance, for example, denseness. In order to provide these properties, the inner main surface layer is preferably different from the outer main surface layer in amount of materials, for example. Specifically, in formation of the inner main surface layer and the outer main surface layer, the amount of a binder resin used for the inner main surface layer is preferably larger than that for the outer main surface layer, for example. Accordingly, the outer main surface layer is denser than the inner main surface layer. The difference in density between the inner main surface layer and the outer main surface layer is able to be confirmed by observation of their polished cross sections with an electron microscope.

As shown in FIG. 2 and FIG. 3, the laminate 110a includes an inner layer portion where the internal electrode layers 140 oppose each other with the dielectric ceramic layer 130 therebetween and a pair of outer layer portions that sandwich the inner layer portion in the lamination direction T. In other words, the laminate 110a is divided into the inner layer portion and the pair of outer layer portions in the lamination direction T.

One of the outer layer portions includes the first main surface 111a of the laminate 110a. The outer layer portion includes the dielectric ceramic layer 130 between the first main surface 111a and the internal electrode layer 140 closest to the first main surface 111a (a second internal electrode layer 142 in FIG. 2 and FIG. 3).

The other of the outer layer portions includes the second main surface 112a of the laminate 110a. The outer layer portion includes the dielectric ceramic layer 130 between the second main surface 112a and the internal electrode layer 140 closest to the second main surface 112a (a first internal electrode layer 141 in FIG. 2 and FIG. 3).

The inner layer portion is a region sandwiched by the outer layer portions. In other words, the inner layer portion includes the dielectric ceramic layers 130 that do not define the outer layer portions and all the internal electrode layers 140.

The outer layer portions may be different from the side surface layers and the main surface layers in amount of materials. This is because the outer layer portions are provided with a focus on the compression bonding properties in formation of the laminate while the side surface layers and the main surface layers are provided with a focus on the adhesion and environment resistance. Specifically, in formation of the outer layer portions, the side surface layers, and the main surface layers, the amount of the binder resin used for the outer layer portions is preferably larger than that for each of the side surface layers and the main surface layers, for example. Accordingly, the side surface layers and the main surface layers are denser than the outer layer portions. The difference in density between the outer layer portions, the side surface layers, and the main surface layers is able to be confirmed by observation of their polished cross sections with an electron microscope.

The number of the dielectric ceramic layers 130 laminated is preferably about 100 or more and about 500 or less, for example. Each of the dielectric ceramic layers 130 in the inner layer portion preferably has a thickness of about 0.2 μm or larger and about 10 μm or smaller, for example.

Each dielectric ceramic layer 130 includes a perovskite compound including Ba or Ti, for example. The dielectric ceramic layer 130 may include a dielectric ceramic mainly including a compound such as $BaTiO_3$, $CaTiO_3$, $SrTiO_3$, or $CaZrO_3$. A material is also usable which includes any of the above main compounds and an accessory compound such as a Mn compound, a Mg compound, a Si compound, a Fe compound, a Cr compound, a Co compound, a Ni compound, an Al compound, a V compound, or a rare earth compound.

The pairs of internal electrode layers 140 include first internal electrode layers 141 electrically connected to the first external electrode 121 and second internal electrode layers 142 electrically connected to the second external electrode 122.

The number of the internal electrode layers 140 laminated is preferably about 100 or more and about 500 or less, for example. Each of the internal electrode layers 140 preferably has a thickness of about 0.3 μm or larger and about 2.0 μm or smaller, for example. The coverage of each of the internal electrode layers 140 covering the dielectric ceramic layers 130 without any gap is preferably about 70% or more and about 100% or less, for example.

Each internal electrode layer 140 includes one metal selected from the group consisting of Ni, Cu, Ag, Pd, and Au or an alloy including any of these metals, for example, an alloy of Ag and Pd. The internal electrode layers 140 may include dielectric particles having the same or similar composition as the dielectric ceramic in the dielectric ceramic layers 130.

The first internal electrode layers 141 and the second internal electrode layers 142 each have a substantially quadrangular shape in a plan view. The first internal electrode layers 141 and the second internal electrode layers 142 are alternately located at equal or substantially equal intervals in the lamination direction T of the laminate 110a. A first internal electrode layer 141 and a second internal electrode layer 142 oppose each other with a dielectric ceramic layer 130 therebetween. The first internal electrode layer 141 includes a counter electrode that opposes the second internal electrode layer 142 and an extraction electrode that is extracted from the counter electrode and extends to the first end surface 115 of the laminate 110a. The second internal electrode layer 142 includes a counter electrode that opposes the first internal electrode layer 141 and an extraction electrode that is extracted from the counter electrode and extends to the second end surface 116 of the laminate 110a. The counter electrodes oppose each other. The dielectric ceramic layer 130 present between the counter electrodes generates capacitance, and thus defines and functions as a capacitor.

In the component body 110, as viewed in the lamination direction T, the position between the counter electrodes and the first side surface 113 is a first side margin, the position between the counter electrodes and the second side surface 114 is a second side margin, the position between the counter electrodes and the first end surface 115 is a first end margin, and the position between the counter electrodes and the second end surface 116 is a second end margin.

The first side margin is defined by the first side surface layer 110b. The second side margin is defined by the second side surface layer 110c. The first end margin is defined by the extraction electrodes of the first internal electrode layers 141 and the dielectric ceramic layers 130 adjacent to the respective extraction electrodes. The second end margin is defined by the extraction electrodes of the second internal electrode layers 142 and the dielectric ceramic layers 130 adjacent to the respective extraction electrodes.

In FIG. 2, the length indicated by $W_1$ is preferably about 10 μm or longer and about 20 μm or shorter, for example. The length indicated by $T_1$ is preferably about 20 μm or longer and about 60 μm or shorter, for example. To significantly increase the effective region, the length indicated by $T_1$ is preferably triple the length indicated by $W_1$ or shorter, more preferably double the length indicated by $W_1$ or shorter, for example.

The first external electrode 121 is on the first end surface 115 of the laminate 110a. In the example shown in FIG. 1, the first external electrode 121 extends from the first end surface 115 of the component body 110 to each of the first main surface 111, the second main surface 112, the first side surface 113, and the second side surface 114. In other words, the first external electrode 121 extends from the first end surface 115 of the laminate 110a to each of the first main surface layer 110d, the second main surface layer 110e, the first side surface layer 110b, and the second side surface layer 110c.

The second external electrode 122 is on the second end surface 116 of the laminate 110a. In the example shown in FIG. 1, the second external electrode 122 extends from the second end surface 116 of the component body 110 to each of the first main surface 111, the second main surface 112, the first side surface 113, and the second side surface 114. In other words, the second external electrode 122 extends from the second end surface 116 of the laminate 110a to each of the first main surface layer 110d, the second main surface layer 110e, the first side surface layer 110b, and the second side surface layer 110c.

Each of the first external electrode 121 and the second external electrode 122 includes, for example, a base electrode layer and a plating layer on the base electrode layer. The base electrode layer includes at least one of a baked layer, a resin layer, or a thin-film layer.

The baked layer includes glass and a metal. The metal material in the baked layer is one metal selected from the group consisting of Ni, Cu, Ag, Pd, and Au or an alloy including any of these metals, for example, an alloy of Ag and Pd. The baked layer may include a plurality of layers laminated together. The baked layer may be a layer provided by baking a conductive paste applied to the component body 110 or a layer fired simultaneously with the internal electrode layers 140. The baked layer preferably has a thickness of about 10 μm or larger and about 30 μm or smaller, for example.

The resin layer includes conductive particles and a thermosetting resin. The resin layer, if provided, may be directly provided on the component body 110 without the baked layer. The resin layer may include a plurality of layers laminated together. The resin layer preferably has a thickness of about 10 μm or larger and about 50 μm or smaller, for example.

The thin-film layer is formed by a thin-film forming method, for example, sputtering or deposition. The thin-film layer is a layer of deposited metal particles having a thickness of about 1 μm or smaller.

The plating layer may include one metal selected from the group consisting of Ni, Cu, Ag, Pd, and Au or an alloy including any of these metals, for example, an alloy of Ag and Pd.

The plating layer may include a plurality of layers laminated together. In this case, the plating layer preferably has a two-layer structure in which a Sn plating layer is on a Ni plating layer, for example. The Ni plating layer significantly reduces or prevents the base electrode layer from being eroded by solder that mounts the multilayer ceramic electronic component. The Sn plating layer significantly increases the wettability of solder that mounts the multilayer ceramic electronic component, facilitating mounting of the multilayer ceramic electronic component. Each layer in the plating layer preferably has a thickness of about 1 μm or larger and about 10 μm or smaller, for example.

In the multilayer ceramic capacitor 100, the overall dimension in the length direction L, the overall dimension in the width direction W, and the overall dimension in the lamination direction T are about, for example, 1.6 mm×0.8 mm×0.8 mm, 1.0 mm×0.5 mm×0.5 mm, 0.6 mm×0.3 mm×0.3 mm, 0.4 mm×0.2 mm×0.2 mm, or 0.2 mm×0.1 mm×0.1 mm. The overall dimensions of the multilayer ceramic capacitor 100 are able to be measured with a micrometer or by observation of the multilayer ceramic capacitor 100 with a microscope.

Hereinafter, a method of producing a multilayer ceramic capacitor according to a first preferred embodiment of the present invention is described.

The method of producing a multilayer ceramic capacitor according to the first preferred embodiment of the present invention includes: preparing a laminate; forming a pair of side surface layers on the respective side surfaces of the laminate; forming a pair of main surface layers covering interfaces between the laminate and the side surface layers on the respective main surfaces of the laminate; and forming a pair of external electrodes connected to the respective internal electrode layers on the respective end surfaces of the laminate.

Figure 7:
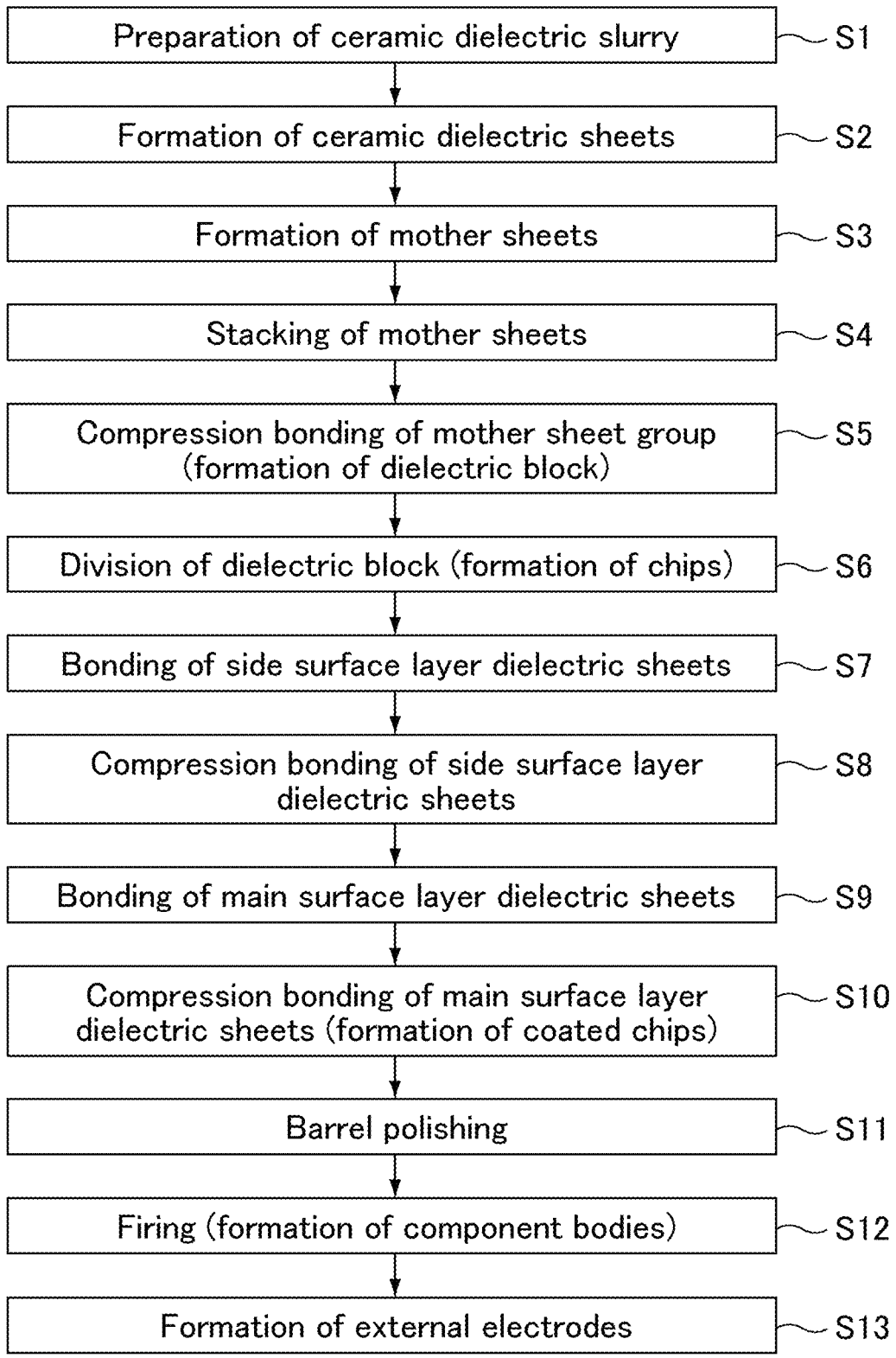
FIG. 7 is a flowchart showing an example method of producing the multilayer ceramic capacitor according to the first preferred embodiment of the present invention.

FIG. 7 is a flowchart showing an example method of producing the multilayer ceramic capacitor according to the first preferred embodiment of the present invention.

First, a ceramic dielectric slurry is prepared (step S1). Specifically, materials, for example, ceramic dielectric powder, additive powder, a binder resin, and a solvent are dispersion-mixed, and thus a ceramic dielectric slurry is prepared. The ceramic dielectric slurry may be a solvent-based one or a water-based one. When a ceramic dielectric slurry is to be formed into a water-based coating material, the ceramic dielectric slurry is prepared by mixing a material, for example, a water-soluble binder and a dispersant, and a dielectric material dissolved in water.

Next, ceramic dielectric sheets are formed (step S2). Specifically, the ceramic dielectric slurry is molded into sheets on carrier films with a coater, for example, a die coater, a gravure coater, or a micro gravure coater, followed by drying, and thus ceramic dielectric sheets are formed. Each ceramic dielectric sheet preferably has a thickness of about 3 μm or smaller in order to reduce the size and increase the capacity of the multilayer ceramic capacitor, for example.

Then, mother sheets are formed (step S3). Specifically, a conductive paste is applied to each of the ceramic dielectric sheets in a predetermined pattern, and thereby mother sheets each with predetermined patterned internal electrodes on a ceramic dielectric sheet are formed. The method of applying the conductive paste may be, for example, screen printing, inkjet printing, or gravure printing. The patterned internal electrodes preferably have a thickness of about 1.5 µm or smaller in order to reduce the size and increase the capacity of the multilayer ceramic capacitor, for example. In addition to these mother sheets having the pattered internal electrodes, ceramic dielectric sheets not subjected to step S3 are also prepared as mother sheets.

Figure 8:
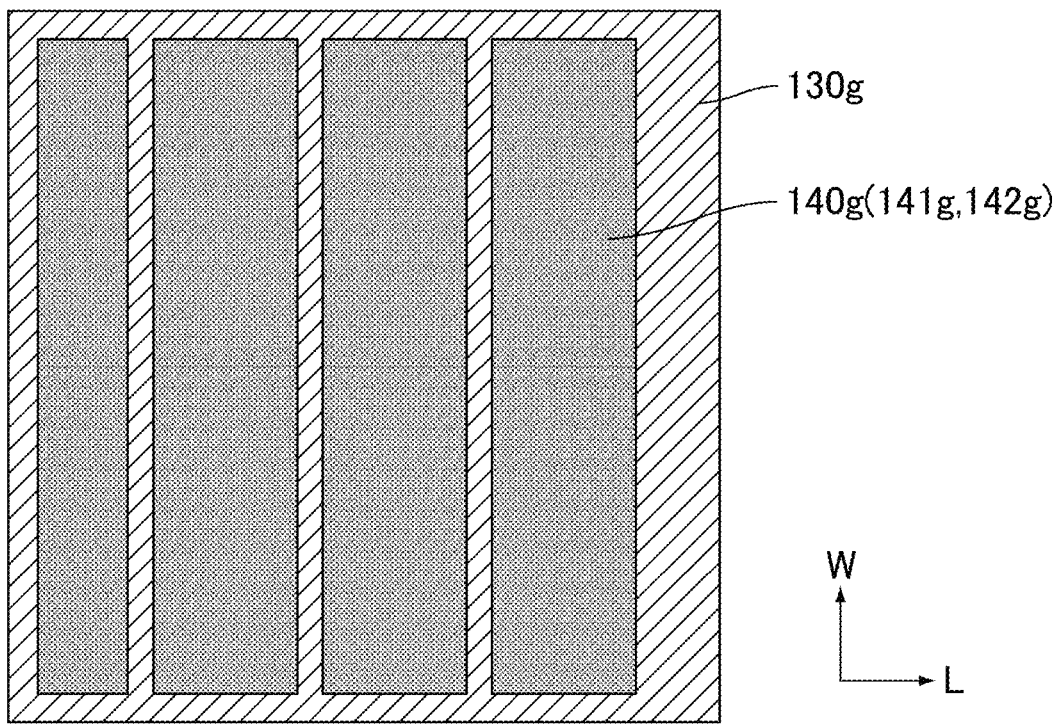
FIG. 8 is a plan view showing the structure of a mother sheet with patterned internal electrodes.

FIG. 8 is a plan view showing the structure of a mother sheet with patterned internal electrodes. In the mother sheet shown in FIG. 8, belt-shaped patterned internal electrodes 140g are provided at equal or substantially equal intervals with a gap therebetween on a ceramic dielectric sheet 130g.

Subsequently, the mother sheets are stacked (step S4). Specifically, a predetermined number of mother sheets each including a ceramic dielectric sheet 130g without patterned internal electrodes are stacked. Thereon, a predetermined number of mother sheets with the patterned internal electrodes 140g are stacked at a position shifted by a half pitch in the length direction L.

Figure 9:
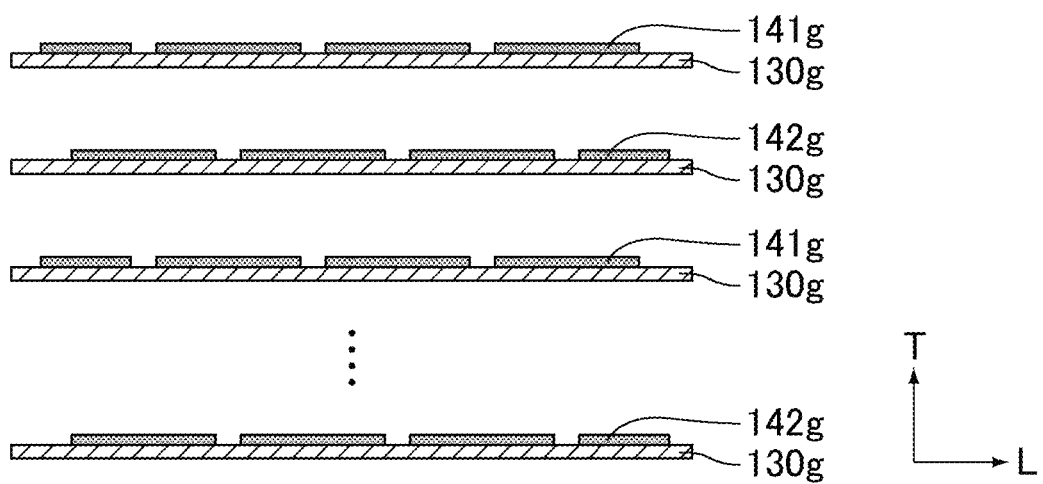
FIG. 9 is an exploded side view showing the state where mother sheets with patterned internal electrodes are stacked.

FIG. 9 is an exploded side view showing the state where mother sheets with patterned internal electrodes are stacked. As shown in FIG. 9, the mother sheets are stacked at the positions shifted from each other by a half pitch in the length direction L, and thus the patterned internal electrodes 140g are shifted from each other by a half pitch. Specifically, the mother sheets are stacked in the state that first patterned internal electrodes 141g defining the first internal electrode layer 141 and second patterned internal electrodes 142g defining the second internal electrode layer 142 are shifted from each other by a half pitch in the length direction L.

Thereon, a predetermined number of mother sheets each including a ceramic dielectric sheet 130g without patterned internal electrodes are stacked. Thereby, a mother sheet group is formed.

The mother sheets having the patterned internal electrodes on the ceramic dielectric sheet define the inner layer portion of the laminate when fired. The mother sheets each including a ceramic dielectric sheet without patterned internal electrodes define the outer layer portions of the laminate when fired. The ceramic dielectric sheets defining the outer layer portions are preferably different from the later-described side surface layer dielectric sheets and main surface layer dielectric sheets in amount of materials, for example. Specifically, the ceramic dielectric sheets defining the outer layer portions preferably include a larger amount of the binder resin than the side surface layer dielectric sheets and the main surface layer dielectric sheets, for example.

The mother sheet group is compression bonded, and thus a dielectric block is formed (step S5). Specifically, the mother sheet group is pressed in the lamination direction by hydrostatic pressing or rigid pressing for compression bonding, and thus a dielectric block is formed.

The dielectric block is divided into chips (step S6). Specifically, the dielectric block is divided into a matrix by push cutting, dicing, or laser cutting, and thus the dielectric block is divided into individual chips. Each chip is fired into a laminate 110a as described later.

Figure 10:
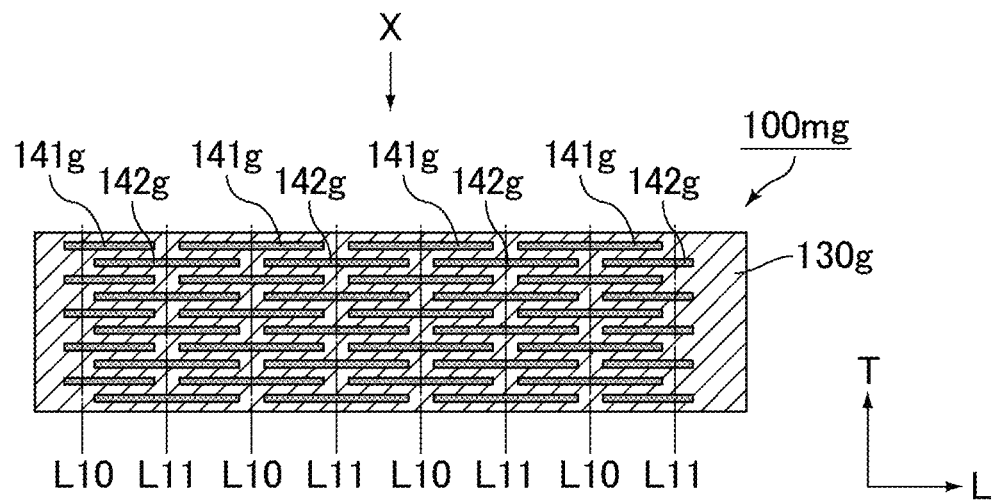
FIG. 10 is a cross-sectional view showing division lines at which a dielectric block is divided.
Figure 11:
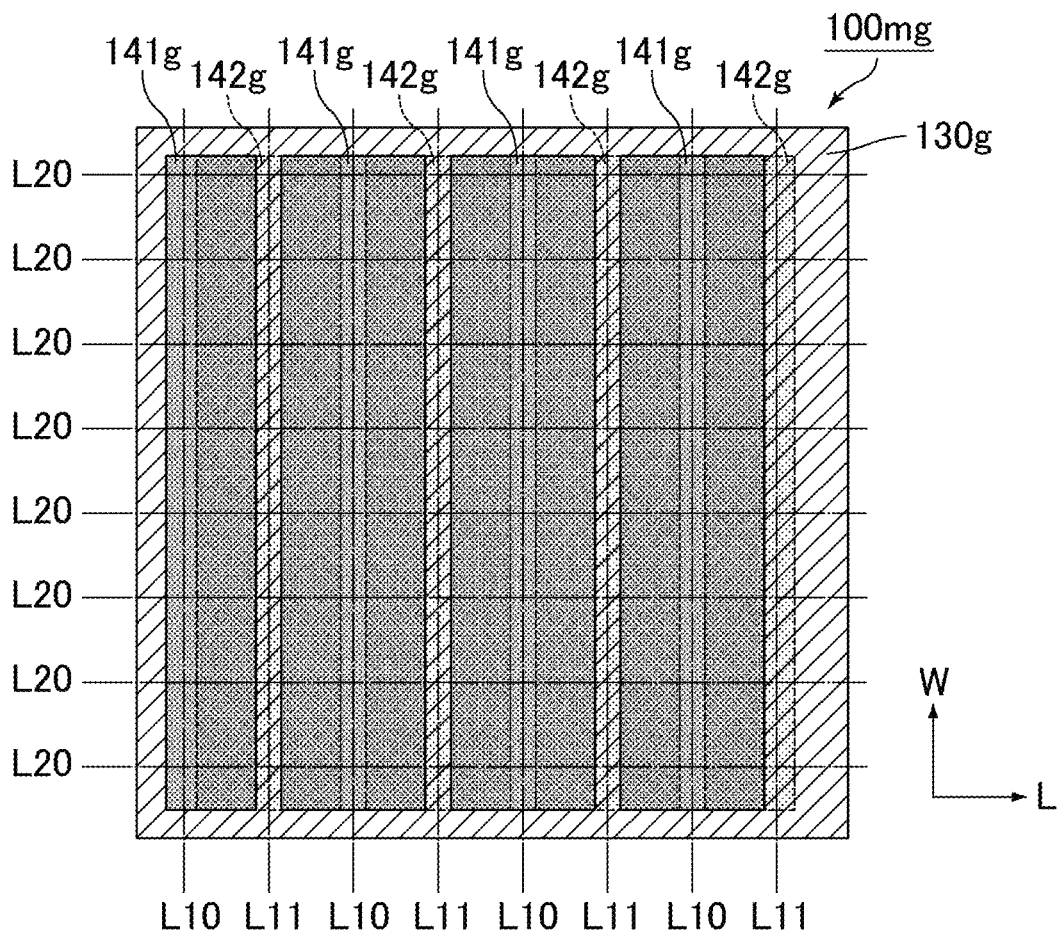
FIG. 11 is a plan view showing division lines for the dielectric block shown in FIG. 10 as viewed in the direction of the arrow X.

FIG. 10 is a cross-sectional view showing division lines at which a dielectric block is divided. FIG. 11 is a plan view showing division lines for the dielectric block shown in FIG. 10 as viewed in the direction of the arrow X. FIG. 10 is a cross-sectional view showing the cross sections taken in the length direction L and the lamination direction T.

As shown in FIG. 10 and FIG. 11, division lines L10 and division lines L11 are alternately provided at equal or substantially equal intervals in the length direction L. At each division line L10, the first patterned internal electrodes 141g are divided. At each division line L11, the second patterned internal electrodes 142g are divided. Division lines L20 are provided at equal or substantially equal intervals in the width direction W. Each portion surrounded by a division line L10, a division line L11, and two adjacent division lines L20 corresponds to one chip.

The ends of the first patterned internal electrodes 141g are exposed on one of the end surfaces of the chip. The ends of the second patterned internal electrodes 142g are exposed on the other end surface of the chip. The sides of the first patterned internal electrodes 141g and the second patterned internal electrodes 142g are exposed on each side surface of the chip.

To each side surface of the chip is bonded a side surface layer dielectric sheet (step S7). The side surface layer dielectric sheet defines the first side surface layer 110b and the second side surface layer 110c as described later. The side surface layer dielectric sheet may be a one-layer sheet or a multilayer sheet in which two or more dielectric sheets are bonded to each other.

For example, in production of the multilayer ceramic capacitor 100 shown in FIG. 1, an inner side surface layer dielectric sheet and an outer side surface layer dielectric sheet are bonded to each other to form a side surface layer dielectric laminate sheet.

The side surface layer dielectric laminate sheet is able to be formed by the same or similar method as the method of forming a dielectric laminate sheet disclosed in JP 2017-147358 A.

The inner side surface layer dielectric sheet defines the first inner side surface layer 150b and the second inner side surface layer 150c as described later. The outer side surface layer dielectric sheet defines the first outer side surface layer 151b and the second outer side surface layer 151c as described later.

The inner side surface layer dielectric sheet is formed by molding a ceramic dielectric slurry into a sheet with a die coater, a gravure coater, or a micro gravure coater, for example, on a resin film, followed by drying. The inner side surface layer dielectric sheet preferably has a thickness of about 1 µm or larger and about 5 µm or smaller, for example.

The outer side surface layer dielectric sheet is formed by molding a ceramic dielectric slurry into a sheet with a die coater, a gravure coater, or a micro gravure coater, for example, on a resin film, followed by drying. The outer side surface layer dielectric sheet preferably has a thickness of about 4 µm or larger and about 20 µm or smaller, for example.

The ceramic dielectric slurry as a material of each of the inner side surface layer dielectric sheet and the outer side surface layer dielectric sheet is prepared by the same or similar method as in step S1 above, with the binder being polyvinyl butyral or polyvinyl alcohol.

The inner side surface layer dielectric sheet is preferably different from the outer side surface layer dielectric sheet in amount of materials, for example. Specifically, the inner side surface layer dielectric sheet preferably includes a larger amount of a binder resin than the outer side surface layer dielectric sheet, for example. Accordingly, the inner side surface layer dielectric sheet is able to have higher stickiness than the outer side surface layer dielectric sheet.

The outer side surface layer dielectric sheet preferably has a higher ceramic particle density than the inner side surface layer dielectric sheet, for example.

The outer side surface layer dielectric sheet preferably has a larger thickness than the inner side surface layer dielectric sheet, which includes a larger amount of the binder resin, in order to provide moisture resistance, for example. The ceramic dielectric slurry that produces the inner side surface layer dielectric sheet and the outer side surface layer dielectric sheet may include different component(s) from the ceramic dielectric slurry that produces a ceramic dielectric sheet that is to define and function as the dielectric ceramic layer 130 of the laminate 110*a*.

The inner side surface layer dielectric sheet preferably has a smaller width than the outer side surface layer dielectric sheet, for example.

The side surface layer dielectric sheets, for example, the side surface layer dielectric laminate sheet, are preferably bonded to the side surfaces of a chip by transferring as described below, for example.

Figure 12:
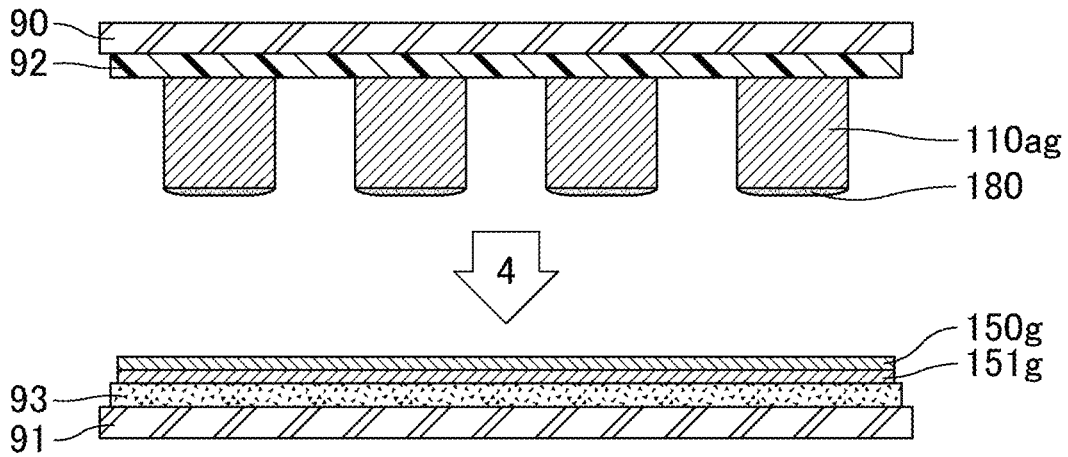
FIG. 12 is a cross-sectional view showing the state where chips are held by a holding plate above a side surface layer dielectric laminate sheet placed on an elastic layer.

FIG. 12 is a cross-sectional view showing the state where chips are held by a holding plate above a side surface layer dielectric laminate sheet placed on an elastic layer.

As shown in FIG. 12, a side surface layer dielectric laminate sheet including an inner side surface layer dielectric sheet 150*g* and an outer side surface layer dielectric sheet 151*g* is removed from a resin film, and then placed on an elastic layer 93. The elastic layer 93 is on a table 91. A thin side surface layer dielectric laminate sheet difficult to handle may be placed on the elastic layer 93 in the state where the resin film is bonded to the side surface layer dielectric laminate sheet in order to make the side surface layer dielectric laminate sheet easier to handle.

Chips 110*ag*, spaced away from each other, are bonded to a foamed release sheet 92 bonded to the bottom surface of the holding plate 90. The top side surface of each of the chips 110*ag* is in contact with the foamed release sheet 92. The bottom side surface of each of the chips 110*ag* opposes the side surface layer dielectric laminate sheet. The bottom side surface of each of the chips 110*ag* is coated with an adhesive 180. The bottom side surface of each of the chips 110*ag*, however, is not necessarily coated with the adhesive 180.

Figure 13:
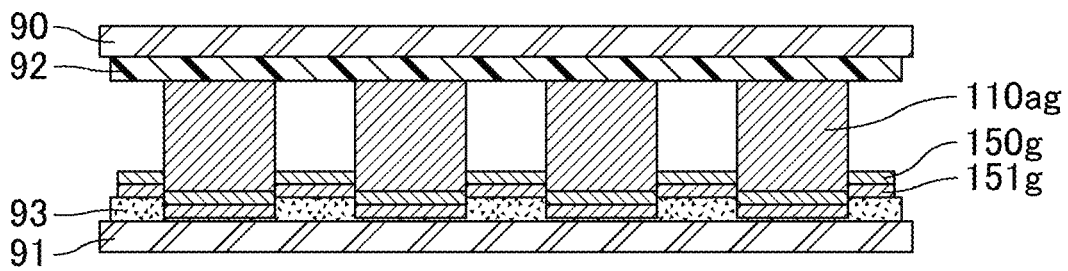
FIG. 13 is a cross-sectional view showing the state where the chips are pressed onto the side surface layer dielectric laminate sheet.

The holding plate 90 is then descended as indicated by an arrow 4, and each of the chips 110*ag* is pressed onto the side surface layer dielectric laminate sheet. FIG. 13 is a cross-sectional view showing the state where the chips are pressed onto the side surface layer dielectric laminate sheet. As shown in FIG. 13, each of the chips 110*ag* is pressed onto the side surface layer dielectric laminate sheet by a pressing force that elastically deforms the elastic layer 93 near the portions where the elastic layer 93 is indirectly in contact with the chips 110*ag*, with the side surface layer dielectric laminate sheet therebetween.

This compression bonds the portions of the side surface layer dielectric laminate sheet sandwiched by the chips 110*ag* and the elastic layer 93 to the respective bottom side surfaces of the chips 110*ag*. Moreover, a shear force is exerted on the side surface layer dielectric laminate sheet at the ridge surrounding the bottom side surface of each of the chips 110*ag*, and thus the side surface layer dielectric laminate sheet is punched out.

Figure 14:
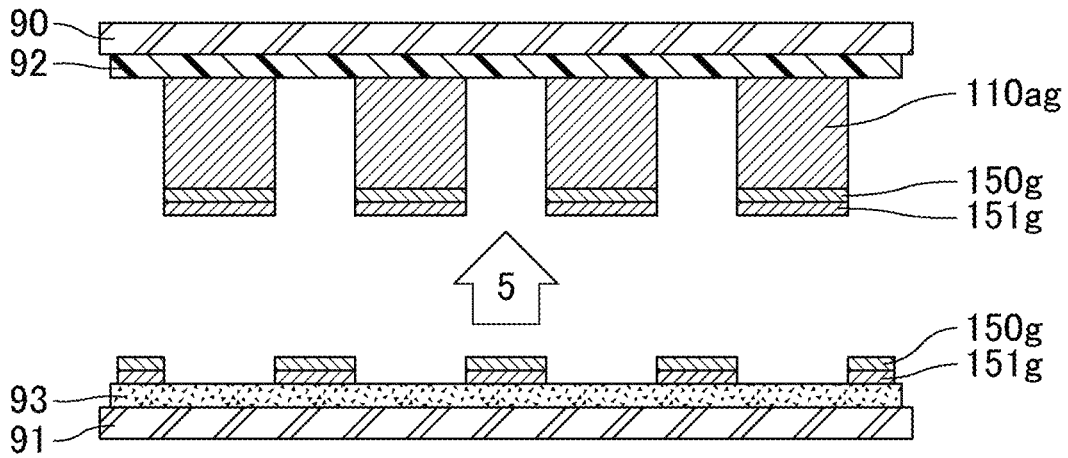
FIG. 14 is a cross-sectional view showing the state where the chips pressed onto the side surface layer dielectric laminate sheet are lifted.

FIG. 14 is a cross-sectional view showing the state where the chips pressed onto the side surface layer dielectric laminate sheet are lifted. As shown in FIG. 14, the holding plate 90 is lifted as indicated by an arrow 5, and each of the chips 110*ag* is withdrawn from the side surface layer dielectric laminate sheet.

In this state, the punched portions of the side surface layer dielectric laminate sheet are bonded to the respective bottom side surfaces of the chips 110*ag*. The side surface layer dielectric laminate sheet may be bonded to the opposite side surfaces of the chips 110*ag* by the same or similar method as described above. The inner side surface layer dielectric sheet 150*g* of the side surface layer dielectric laminate sheet is in contact with each side surface of each of the chips 110*ag*.

The side surface layer dielectric laminate sheet is compression bonded to the chips (step S8). Specifically, the inner side surface layer dielectric sheet 150*g* and the outer side surface layer dielectric sheet 151*g*, held by the heated table 91, are pressed onto to the chips 100*ag*, and thus the inner side surface layer dielectric sheet 150*g* and the outer side surface layer dielectric sheet 151*g* are thermocompression bonded to the chips 110*ag*. Thereby, chips with side surface layers, each of which has the structure shown in FIG. 5, are formed.

To each main surface of each chip with side surface layers is bonded a main surface layer dielectric sheet to cover the interfaces between the chip and the side surface layers (step S9). The main surface layer dielectric sheet, as described later, defines the first main surface layer 110*d* and the second main surface layer 110*e*. The main surface layer dielectric sheet may be a one-layer sheet or a multilayer sheet in which two or more dielectric sheets are bonded to each other. The main surface layer dielectric sheet preferably includes a dielectric sheet having the same or similar dielectric ceramic material composition as the side surface layer dielectric sheets, for example.

For example, in production of the multilayer ceramic capacitor 100 shown in FIG. 1, an inner main surface layer dielectric sheet and an outer main surface layer dielectric sheet are bonded to each other to form a main surface layer dielectric laminate sheet.

The main surface layer dielectric laminate sheet may be formed by the same or similar method as the method of forming a side surface layer dielectric laminate sheet.

The inner main surface layer dielectric sheet defines the first inner main surface layer 150*d* and the second inner main surface layer 150*e* as described later. The outer main surface layer dielectric sheet defines the first outer main surface layer 151*d* and the second outer main surface layer 151*e* as described later.

The inner main surface layer dielectric sheet is formed by molding a ceramic dielectric slurry into a sheet with a die coater, a gravure coater, or a micro gravure coater, for example, on a resin film, followed by drying. The inner main surface layer dielectric sheet preferably has a thickness of about 1 μm or larger and about 5 μm or smaller, for example.

The outer main surface layer dielectric sheet is formed by molding a ceramic dielectric slurry into a sheet with a die coater, a gravure coater, or a micro gravure coater, for example, on a resin film, followed by drying. The outer main surface layer dielectric sheet preferably has a thickness of about 4 μm or larger and about 20 μm or smaller, for example.

The ceramic dielectric slurry as a material of each of the inner main surface layer dielectric sheet and the outer main surface layer dielectric sheet is prepared by the same or similar method as in step S1 above, with the binder being polyvinyl butyral or polyvinyl alcohol.

The inner main surface layer dielectric sheet is preferably different from the outer main surface layer dielectric sheet in amount of materials, for example. Specifically, the inner main surface layer dielectric sheet preferably includes a larger amount of a binder resin than the outer main surface layer dielectric sheet, for example. Accordingly, the inner main surface layer dielectric sheet is able to have higher stickiness than the outer main surface layer dielectric sheet.

The outer main surface layer dielectric sheet preferably has a higher ceramic particle density than the inner main surface layer dielectric sheet, for example.

The outer main surface layer dielectric sheet preferably has a larger thickness than the inner main surface layer dielectric sheet, which includes a larger amount of the binder resin, in order to provide moisture resistance, for example. The ceramic dielectric slurry that produces the inner main surface layer dielectric sheet and the outer main surface layer dielectric sheet may include different component(s) from the ceramic dielectric slurry that produces a ceramic dielectric sheet that is to define and function as the dielectric ceramic layer 130 of the laminate 110a.

The inner main surface layer dielectric sheet preferably has a smaller width than the outer main surface layer dielectric sheet, for example.

The main surface layer dielectric sheets, for example, the main surface layer dielectric laminate sheet, are preferably bonded to the main surfaces of a chip with side surface layers, for example, by transferring as described below.

Figure 15:
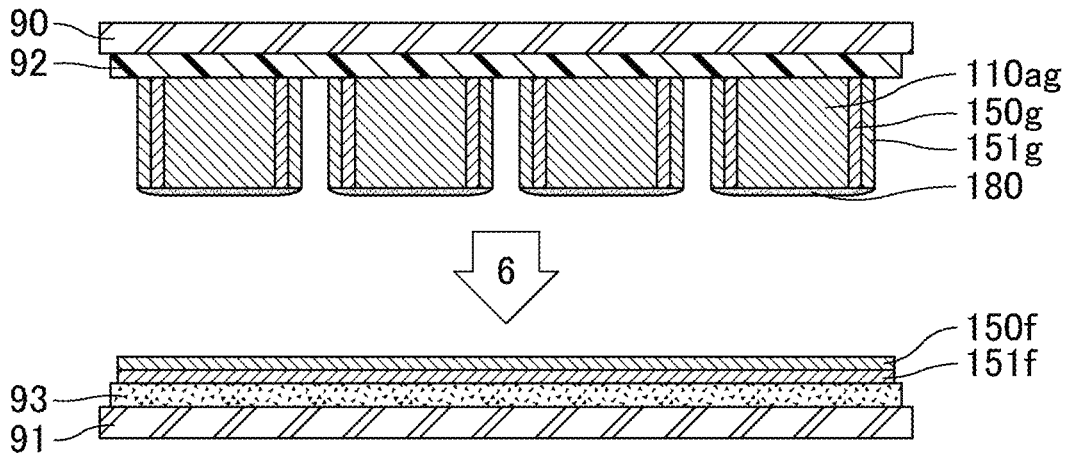
FIG. 15 is a cross-sectional view showing the state where the chips with side surface layers are held by the holding plate above a main surface layer dielectric laminate sheet placed on the elastic layer.

FIG. 15 is a cross-sectional view showing the state where the chips with side surface layers are held by the holding plate above a main surface layer dielectric laminate sheet placed on the elastic layer.

As shown in FIG. 15, a main surface layer dielectric laminate sheet including an inner main surface layer dielectric sheet 150f and an outer main surface layer dielectric sheet 151f is removed from a resin film, and then placed on the elastic layer 93. The elastic layer 93 is on the table 91. A thin main surface layer dielectric laminate sheet difficult to handle may be placed on the elastic layer 93 in the state where the resin film is bonded to the main surface layer dielectric laminate sheet in order to make the main surface layer dielectric laminate sheet easier to handle.

The chips with side surface layers in each of which a side surface layer dielectric sheet is bonded to each side surface of a chip 110ag, spaced away from each other, are bonded to the foamed release sheet 92 bonded to the bottom surface of the holding plate 90. The top main surface of each of the chips with side surface layers is in contact with the foamed release sheet 92. The bottom main surface of each of the chips with side surface layers opposes the main surface layer dielectric laminate sheet. The bottom main surface of each of the chips with side surface layers is coated with the adhesive 180. The bottom main surface of each of the chips with side surface layers, however, is not necessarily coated with the adhesive 180.

Figure 16:
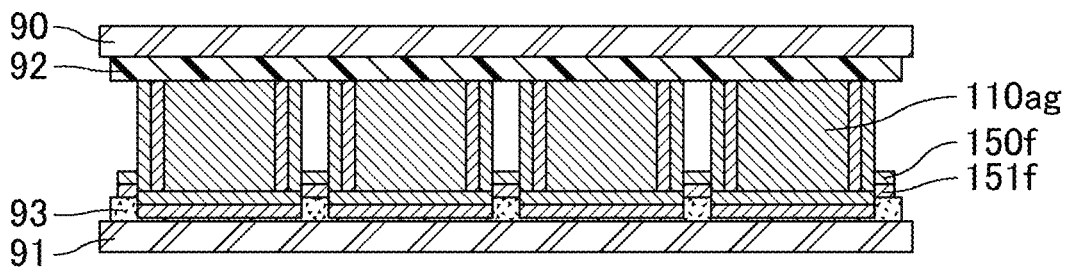
FIG. 16 is a cross-sectional view showing the state where the chips with side surface layers are pressed onto the main surface layer dielectric laminate sheet.

The holding plate 90 is then descended as indicated by an arrow 6, and each of the chips with side surface layers is pressed onto the main surface layer dielectric laminate sheet. FIG. 16 is a cross-sectional view showing the state where the chips with side surface layers are pressed onto the main surface layer dielectric laminate sheet. As shown in FIG. 16, each of the chips with side surface layers is pressed onto the main surface layer dielectric laminate sheet by a pressing force that elastically deforms the elastic layer 93 near the portions where the elastic layer 93 is indirectly in contact with the chips with side surface layers, with the main surface layer dielectric laminate sheet therebetween.

This compression bonds the portions of the main surface layer dielectric laminate sheet sandwiched by the chips with side surface layers and the elastic layer 93 to the respective bottom main surfaces of the chips with side surface layers. Moreover, a shear force is exerted on the main surface layer dielectric laminate sheet at the ridge surrounding the bottom main surface of each of the chips with side surface layers, and thus the main surface layer dielectric laminate sheet is punched out.

Figure 17:
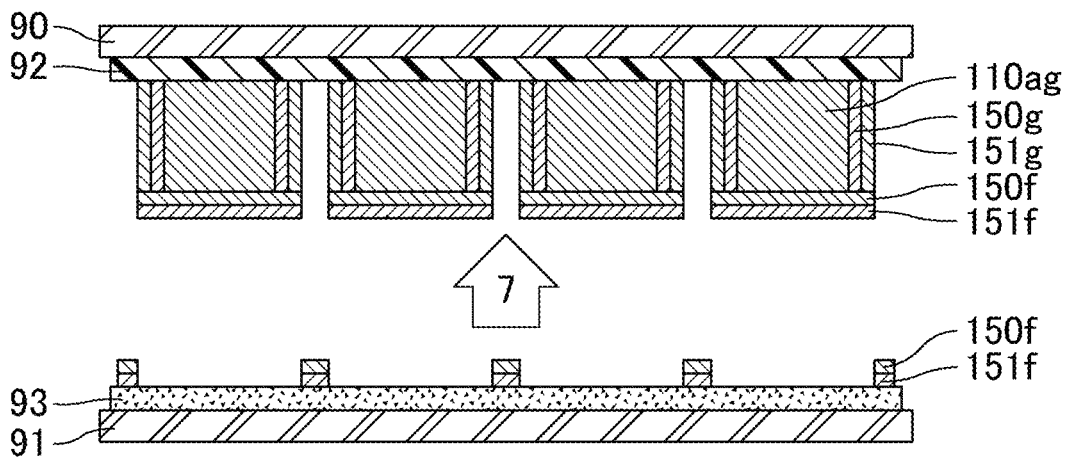
FIG. 17 is a cross-sectional view showing the state where the chips with side surface layers pressed onto the main surface layer dielectric laminate sheet are lifted.

FIG. 17 is a cross-sectional view showing the state where the chips with side surface layers pressed onto the main surface layer dielectric laminate sheet are lifted. As shown in FIG. 17, the holding plate 90 is lifted as indicated by an arrow 7, and each of the chips with side surface layers is withdrawn from the main surface layer dielectric laminate sheet.

In this state, the punched portions of the main surface layer dielectric laminate sheet are bonded to the respective bottom main surfaces of the chips with side surface layers. The main surface layer dielectric laminate sheet may be bonded to the opposite main surfaces of the chips with side surface layers by the same or similar method as described above. The inner main surface layer dielectric sheet 150f of the main surface layer dielectric laminate sheet is in contact with each main surface of each of the chips with side surface layers.

The main surface layer dielectric laminate sheet is compression bonded to the chips with side surface layers (step S10). Specifically, the inner main surface layer dielectric sheet 150f and the outer main surface layer dielectric sheet 151f, held by the heated table 91, are pressed onto the chip with side surface layers, and thus the inner main surface layer dielectric sheet 150f and the outer main surface layer dielectric sheet 151f are thermocompression bonded to the chips with side surface layers. Thereby, coated chips, each of which is to define and function as the component body 110 shown in FIG. 4, are formed.

The coated chips are then subjected to barrel polishing (step S11). Specifically, the coated chips are enclosed together with grinding media balls having higher rigidity than the dielectric material in a small box called barrel, and the barrel is rotated to polish the coated chips. Thereby, the corners and ridges of the coated chips are rounded.

The coated chips are then fired (step S12). Specifically, heating the coated chips causes the dielectric material and the conductive material in the coated chips to be fired, and thus the component bodies 110 are formed. The fired inner side surface layer dielectric sheet 150g defines the first inner side surface layer 150b and the second inner side surface layer 150c. The fired outer side surface layer dielectric sheet 151g defines the first outer side surface layer 151b and the second outer side surface layer 151c. The fired inner main surface layer dielectric sheet 150f defines the first inner main surface layer 150d and the second inner main surface layer 150e. The fired outer main surface layer dielectric sheet 151f defines the first outer main surface layer 151d and the second outer main surface layer 151e. The firing temperature is set as appropriate to suit the dielectric material and the conductive material.

The first external electrode 121 and the second external electrode 122 are formed (step S13). For example, a base electrode layer is formed by firing a conductive paste applied to both an end including the first end surface 115 and an end including the second end surface 116 in each component body 110. The base electrode layer is successively subjected to Ni plating and Sn plating for formation of plating layers. This produces the first external electrode 121 and the second external electrode 122 on the outer surface of the component body 110.

Through the series of steps above, the multilayer ceramic capacitors 100 is able to be produced.

The methods of forming the side surface layers and the main surface layers are not limited to the dielectric sheet bonding and may each be dielectric paste printing. Also, the method of forming a side surface layer and the method of forming a main surface layer may be the same as or different from each other.

A multilayer ceramic capacitor according to a second preferred embodiment of the present invention has the same or similar structure as the multilayer ceramic capacitor according to the first preferred embodiment of the present invention, but is produced by a different method from that in the first preferred embodiment.

In the method of producing a multilayer ceramic capacitor according to the second preferred embodiment of the present invention, the preparing a laminate includes forming a patterned internal electrode on a ceramic dielectric sheet by applying a conductive paste to the ceramic dielectric sheet; and forming a step eliminating ceramic paste layer in a region without the patterned internal electrode on the ceramic dielectric sheet.

Specifically, in step S3 described in the first preferred embodiment, the conductive paste is applied to the ceramic dielectric sheet in a predetermined pattern, and thereby predetermined patterned internal electrodes are provided on the ceramic dielectric sheet, and a mother sheet is formed which is provided with the predetermined patterned internal electrodes on the ceramic dielectric sheet and a step eliminating ceramic paste layer in the region of the ceramic dielectric sheet without the patterned internal electrodes. The other steps are the same as or similar to those in the first preferred embodiment.

Figure 18:
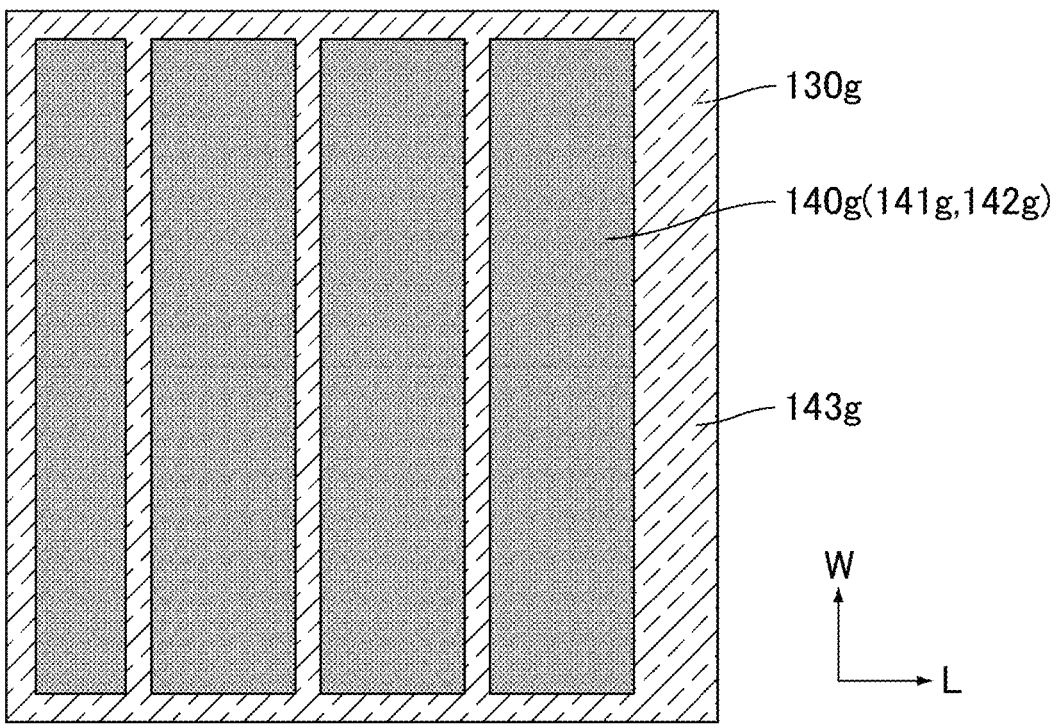
FIG. 18 is a plan view showing the structure of a mother sheet with patterned internal electrodes and a ceramic paste layer.
Figure 19:
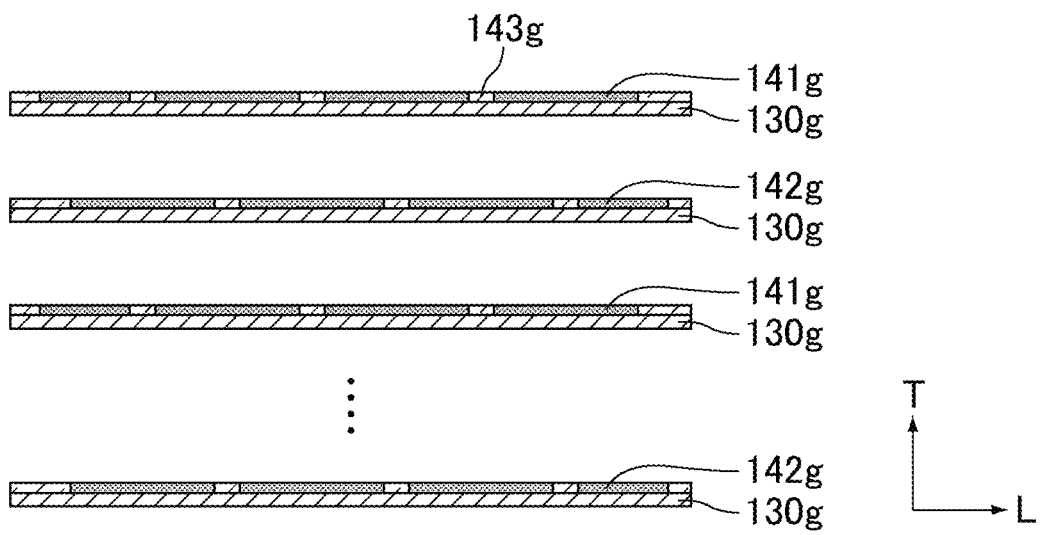
FIG. 19 is an exploded side view showing the state where mother sheets with patterned internal electrodes and a ceramic paste layer are stacked.

FIG. 18 is a plan view showing the structure of a mother sheet with patterned internal electrodes and a ceramic paste layer. FIG. 19 is an exploded side view showing the state where mother sheets with patterned internal electrodes and a ceramic paste layer are stacked.

Each of the mother sheets shown in FIG. 18 and FIG. 19 includes belt-shaped patterned internal electrodes 140g at equal or substantially equal intervals with a gap therebetween on a ceramic dielectric sheet 130g, and a step eliminating ceramic paste layer 143g in the region without the patterned internal electrodes 140g on the ceramic dielectric sheet 130g.

The step eliminating ceramic paste layer 143g is formed by applying a ceramic paste including a dielectric ceramic to the ceramic dielectric sheet 130g. The method of applying the ceramic paste may be, for example, screen printing. The dielectric ceramic included in the ceramic paste is preferably the same as or similar to the dielectric ceramic included in the ceramic dielectric sheet 130g, for example.

As shown in FIG. 19, the mother sheets are stacked at the positions shifted from each other by a half pitch in the length direction L, and the patterned internal electrodes 140g are shifted from each other by a half pitch. Specifically, the mother sheets are stacked in the state that the first patterned internal electrodes 141g defining the first internal electrode layer 141 and the second patterned internal electrodes 142g defining the second internal electrodes layer 142 are shifted from each other by a half pitch in the length direction L.

Thereon, a predetermined number of mother sheets each including a ceramic dielectric sheet 130g without patterned internal electrodes are stacked. Thereby, a mother sheet group is formed.

The ceramic paste layer 143g in the method described above eliminates steps in the mother sheets, ensuring the flatness of the main surfaces of each chip defining the laminate 110a. This leads to sharp ridges of the main surfaces of the chips with side surface layers in bonding of the main surface layer dielectric sheet in step S9, contributing to favorable punchability and transferability of the main surface layer dielectric sheet.

Each side surface layer of the multilayer ceramic capacitor according to the second preferred embodiment of the present invention may have a structure other than the two-layer structure, for example, a one-layer structure or a three or more-layer structure. Similarly, each main surface layer may have a structure other than the two-layer structure, for example, a one-layer structure or a three or more-layer structure.

In a multilayer ceramic capacitor according to a third preferred embodiment of the present invention, at least one of the external electrodes extends from an end surface of the laminate to one or both of the main surface layers, and in the length direction, the distance from the end of the external electrode on the main surface layer to the end surface of the laminate on which the external electrode is provided is longer than the distance from the end of the internal electrode layer not connected to the external electrode to the end surface of the laminate on which the external electrode is provided.

Figure 20:
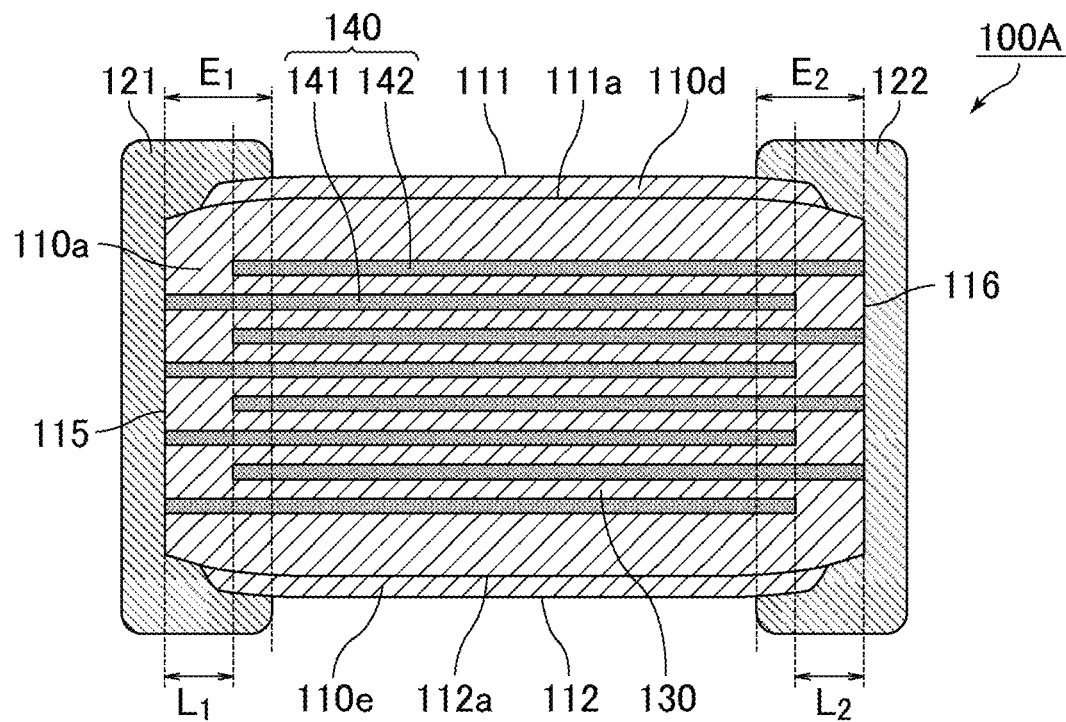
FIG. 20 is a cross-sectional view showing an example multilayer ceramic capacitor according to a third preferred embodiment of the present invention.

FIG. 20 is a cross-sectional view showing an example multilayer ceramic capacitor according to the third preferred embodiment of the present invention.

The first external electrode 121 in a multilayer ceramic capacitor 100A shown in FIG. 20 extends from the first end surface 115 of the laminate 110a to each of the first main surface layer 110d and the second main surface layer 110e. Although not shown, the first external electrode 121 may also extend to each of the first side surface layer 110b and the second side surface layer 110c. The second external electrode 122 extends from the second end surface 116 of the laminate 110a to each of the first main surface layer 110d and the second main surface layer 110e. Although not shown, the second external electrode 122 may also extend to each of the first side surface layer 110b and the second side surface layer 110c.

In FIG. 20, in the length direction, the distance from the end of the first external electrode 121 on the first main surface layer 110d or the second main surface layer 110e to the first end surface 115 of the laminate 110a on which the first external electrode 121 is provided (in FIG. 20, the length indicated by $E_1$) is longer than the distance from the end of the second internal electrode layer 142 not connected to the first external electrode 121 to the first end surface 115 of the laminate 110a on which the first external electrode 121 is provided (in FIG. 20, the length indicated by $L_1$). Similarly, in the length direction, the distance from the end of the second external electrode 122 on the first main surface layer 110d or the second main surface layer 110e to the second end surface 116 of the laminate 110a on which the second external electrode 122 is provided (in FIG. 20, the length indicated by $E_2$) is longer than the distance from the end of the first internal electrode layer 141 not connected to the second external electrode 122 to the second end surface 116 of the laminate 110a on which the second external electrode 122 is provided (in FIG. 20, the length indicated by $L_2$).

Depending on the conditions, for example, the thickness of the internal electrode layer 140, as shown in FIG. 20, the flatness of the first main surface 111a and the second main surface 112a of the laminate 110a may be insufficient, which may make the dimensions in the lamination direction T of the laminate 110a at the first end margin and the second end margin smaller than the dimension in the lamination direction T of the laminate 110a at the portion including the counter electrodes. This leads to insufficient punchability and transferability of the main surface layer dielectric sheet unlike the second preferred embodiment, and the ends of the first main surface layer 110d and the second main surface layer 110e may not reach the first end surface 115 or the second end surface 116 of the laminate 110a as shown in FIG. 20. However, the structure in which the distances indicated by the $E_1$ and $E_2$ are longer than the distances indicated by $L_1$ and $L_2$ allows the interfaces A1 and A2 (see FIG. 5) between the laminate 110a and the first side surface layer 110b and between the laminate 110a and the second side surface layer 110c, respectively, to be covered by the first external electrode 121 and the second external electrode 122. Thus, the interfaces A1 and A2 are invisible from the outside.

Figure 21:
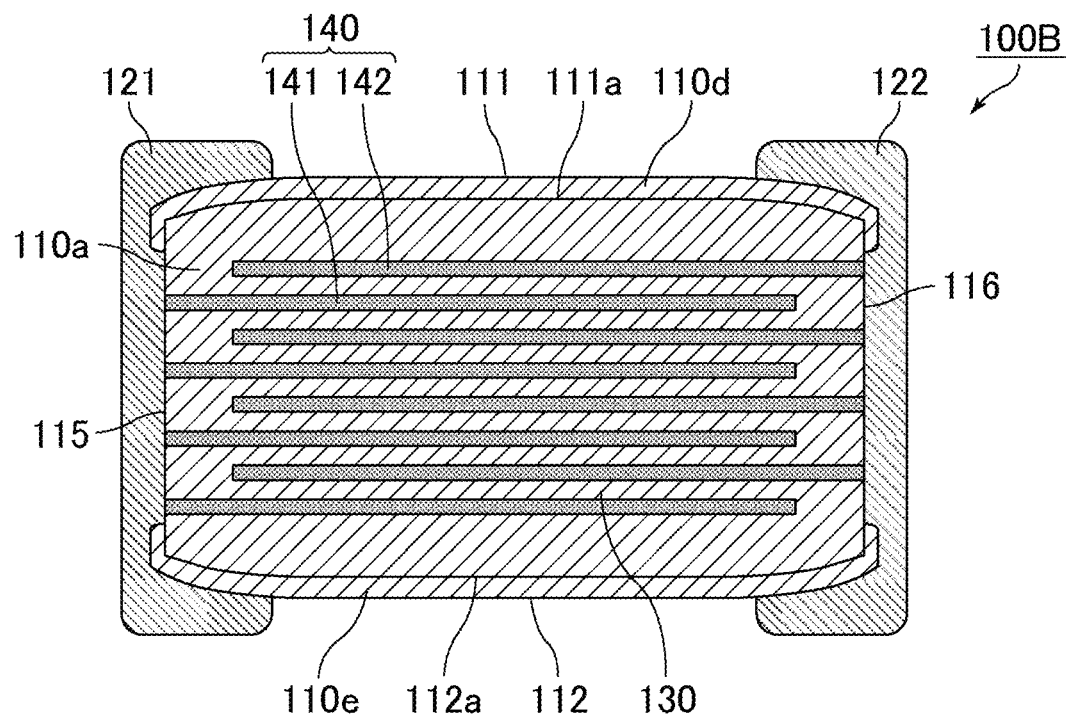
FIG. 21 is a cross-sectional view showing another example multilayer ceramic capacitor according to the third preferred embodiment of the present invention.

FIG. 21 is a cross-sectional view showing another example multilayer ceramic capacitor according to the third preferred embodiment of the present invention.

In a multilayer ceramic capacitor 100B shown in FIG. 21, a portion of the first main surface layer 110d and a portion of the second main surface layer 110e are provided on the first end surface 115 and the second end surface 116 of the laminate 110a. This structure is also acceptable as long as the first main surface layer 110d and the second main surface layer 110e do not cover the first internal electrode layers 141 exposed on the first end surface 115 of the laminate 110a and the second internal electrode layers 142 exposed on the second end surface 116 of the laminate 110a, respectively. The structure in which a portion of the first main surface layer 110d and a portion of the second main surface layer 110e are provided on the first end surface 115 and the second end surface 116 of the laminate 110a has a larger area of the first main surface layer 110d and the second main surface layer 110e in contact with the first external electrode 121 or the second external electrode 122 than the structure in which the first main surface layer 110d and the second main surface layer 110e are not provided on the first end surface 115 and the second end surface 116 of the laminate 110a. This increases the adhesiveness to the first external electrode 121 or the second external electrode 122.

Each side surface layer of the multilayer ceramic capacitor according to the third preferred embodiment of the present invention may have a structure other than the two-layer structure, for example, a one-layer structure or a three or more-layer structure. Similarly, each main surface layer may have a structure other than the two-layer structure, for example, a one-layer structure or a three or more-layer structure.

A multilayer ceramic capacitor according to a fourth preferred embodiment of the present invention further includes a pair of other side surface layers that are provided on respective outer surfaces of the pair of side surface layers and cover interfaces between the side surface layers and the main surface layers.

Figure 22:
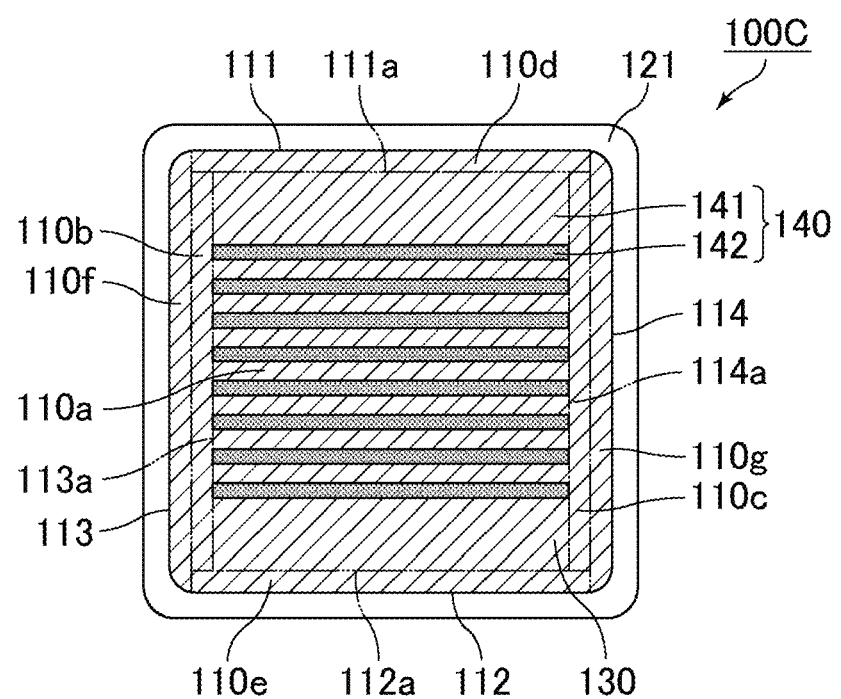
FIG. 22 is a cross-sectional view showing an example multilayer ceramic capacitor according to a fourth preferred embodiment of the present invention.

FIG. 22 is a cross-sectional view showing an example multilayer ceramic capacitor according to the fourth preferred embodiment of the present invention.

A multilayer ceramic capacitor 100C shown in FIG. 22 includes the laminate 110a, the first side surface layer 110b, the second side surface layer 110c, the first main surface layer 110d, the second main surface layer 110e, a third side surface layer 110f, and a fourth side surface layer 110g.

The first side surface layer 110b, the second side surface layer 110c, the first main surface layer 110d, and the second main surface layer 110e are the same as or similar to those in the first preferred embodiment.

The third side surface layer 110f is provided on the outer surface of the first side surface layer 110b and covers the interface between the first side surface layer 110b and the first main surface layer 110d and the interface between the first side surface layer 110b and the second main surface layer 110e. Similarly, the fourth side surface layer 110g is provided on the outer surface of the second side surface layer 110c and covers the interface between the second side surface layer 110c and the first main surface layer 110d and the interface between the second side surface layer 110c and the second main surface layer 110e.

Although not shown, the multilayer ceramic capacitor 100C may further include a third main surface layer that is provided on the outer surface of the first main surface layer 110d and covers the interface between the first main surface layer 110d and the third side surface layer 110f and the interface between the first main surface layer 110d and the fourth side surface layer 110g. Similarly, the multilayer ceramic capacitor 100C may further include a fourth main surface layer that is provided on the outer surface of the second main surface layer 110e and covers the interface between the second main surface layer 110e and the third side surface layer 110f and the interface between the second main surface layer 110e and the fourth side surface layer 110g.

As described above, the multilayer ceramic capacitor according to the fourth preferred embodiment of the present invention may further include a pair of other main surface layers that are provided on the respective outer surfaces of the pair of main surface layers and cover the interfaces between the main surface layers and the above-described other side surface layers.

Each side surface layer of the multilayer ceramic capacitor according to the fourth preferred embodiment of the present invention may have a structure other than the two-layer structure, for example, a one-layer structure or a three or more-layer structure. Similarly, each main surface layer may have a structure other than the two-layer structure, for example, a one-layer structure or a three or more-layer structure.

The multilayer ceramic capacitor according to the fourth preferred embodiment of the present invention may be produced by the method described in the first preferred embodiment or the method described in the second preferred embodiment.

The multilayer ceramic electronic component of the present invention is not limited to the above preferred embodiments. Various applications and modifications may be made within the scope of the present invention for the structures, production conditions, and the like of a multilayer ceramic electronic component, for example, a multilayer ceramic capacitor.

In the method of producing a multilayer ceramic electronic component of the present invention, each side surface layer is preferably formed as an unfired layer on a side surface of an unfired laminate, for example. Each main surface layer may be formed as an unfired layer on a main surface of an unfired laminate or may be formed on a main surface of a fired laminate. When a main surface layer is formed on a main surface of a fired laminate, an unfired main surface layer may be formed on the main surface and the laminate may be fired again. Also, a resin layer may be formed as a main surface layer on a main surface of a fired laminate. When a resin layer is formed as a main surface layer, an external electrode including a conductive resin is preferably formed, for example.

The production method described in the first preferred embodiment includes dividing a dielectric block along the division lines L10, L11, and L20 to produce chips, forming side surface layers on the side surfaces of each chip, and forming main surface layers on the main surfaces of each chip. However, the following modification may be implemented.

First, a dielectric block is divided along the division line L20 to produce rod-shaped green blocks in which the first patterned internal electrodes 141g and the second patterned internal electrodes 142g are exposed on the side surfaces that emerged from the division. Then, side surface layers are formed on the side surfaces of each green block, and main surface layers are formed on the main surfaces, followed by dividing along the division lines L10 and L11. Alternatively, side surface layers are formed on the side surfaces of each green block, the green blocks are divided along the division lines L10 and L11, and then main surface layers are formed on the main surfaces. The subsequent processes may be the same as or similar to those described in the method above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminate including a plurality of dielectric ceramic layers and at least a pair of internal electrode layers laminated together, the laminate including a pair of main surfaces that oppose each other in a lamination direction, a pair of side surfaces that oppose each other in a width direction perpendicular or substantially perpendicular to the lamination direction, and a pair of end surfaces that oppose each other in a length direction perpendicular or substantially perpendicular to the lamination direction and the width direction, and the laminate including an inner layer portion where the internal electrode layers oppose each other with a dielectric ceramic layer of the plurality of dielectric ceramic layers therebetween, and a pair of outer layer portions sandwiching the inner layer portion in the lamination direction;
a pair of side surface layers respectively provided on the side surfaces of the laminate, the pair of side surface layers covering interfaces between the pair of outer layer portions and the inner layer portion;
a pair of main surface layers covering interfaces between the laminate and the side surface layers respectively provided on the main surfaces of the laminate; and
a pair of external electrodes respectively connected to the internal electrode layers respectively provided on the end surfaces of the laminate.

2. The multilayer ceramic electronic component according to claim 1, wherein the side surface layers and the main surface layers each include a ceramic layer having the same or substantially the same material composition.

3. The multilayer ceramic electronic component according to claim 1, wherein:
an amount of materials included in the outer layer portions is different from an amount of materials included in the side surface layers and an amount of materials included in the main surface layers.

4. The multilayer ceramic electronic component according to claim 1, wherein:
the main surface layers each include an inner main surface layer in contact with the laminate and an outer main surface layer provided outside an outer surface of the inner main surface layer; and
an amount of materials included in the inner main surface layer is different from an amount of materials included in the outer main surface layer.

5. The multilayer ceramic electronic component according to claim 1, wherein:
the side surface layers each include an inner side surface layer in contact with the laminate and an outer side surface layer provided outside an outer surface of the inner side surface layer; and
an amount of materials included in the inner side surface layer is different from an amount of materials included in the outer side surface layer.

6. The multilayer ceramic electronic component according to claim 1, wherein:
at least one of the external electrodes extends from an end surface of the laminate to one or both of the main surface layers; and
in the length direction, a distance from an end of the external electrode on the main surface layer to the end surface of the laminate on which the external electrode is provided is longer than a distance from an end of the internal electrode layer not connected to the external electrode to the end surface of the laminate on which the external electrode is provided.

7. The multilayer ceramic electronic component according to claim 1, wherein the multilayer ceramic electronic component further includes a pair of other side surface layers that are provided on respective outer surfaces of the pair of side surface layers and cover interfaces between the side surface layers and the main surface layers.

8. A method of producing a multilayer ceramic electronic component, comprising:
preparing a laminate including a plurality of dielectric ceramic layers and at least a pair of internal electrode layers laminated together, the laminate including a pair of main surfaces that oppose each other in a lamination direction, a pair of side surfaces that oppose each other in a width direction perpendicular or substantially perpendicular to the lamination direction, and a pair of end surfaces that oppose each other in a length direction perpendicular or substantially perpendicular to the lamination direction and the width direction, and the laminate including an inner layer portion where the internal electrode layers oppose each other with a dielectric ceramic layer of the plurality of dielectric ceramic layers therebetween, and a pair of outer layer portions sandwiching the inner layer portion in the lamination direction;
forming a pair of side surface layers, respectively, on the side surfaces of the laminate, the pair of side surface layers covering interfaces between the pair of outer layer portions and the inner layer portion;
forming a pair of main surface layers covering interfaces between the laminate and the side surface layers, respectively, on the main surfaces of the laminate; and
forming a pair of external electrodes respectively connected to the internal electrode layers respectively provided on the end surfaces of the laminate.

9. The method of producing a multilayer ceramic electronic component according to claim 8, wherein the preparing a laminate includes:
forming a patterned internal electrode on a ceramic dielectric sheet by applying a conductive paste to the ceramic dielectric sheet; and
forming a step eliminating ceramic paste layer in a region without the patterned internal electrode on the ceramic dielectric sheet.

10. The multilayer ceramic electronic component according to claim 1, wherein at least one of the main surfaces, the side surfaces, or the end surfaces is an uneven surface.

11. The multilayer ceramic electronic component according to claim 1, wherein the side surface layers and the main surface layers each include a perovskite compound.

12. The multilayer ceramic electronic component according to claim 1, wherein each of the plurality of dielectric ceramic layers includes a same or substantially a same material.

13. The multilayer ceramic electronic component according to claim 5, wherein the outer side surface layer is denser than the inner side surface layer.

14. The multilayer ceramic electronic component according to claim 4, wherein the outer main surface layer is denser than the inner main surface layer.

15. The multilayer ceramic electronic component according to claim 3, wherein the side surface layers and the main surface layers are denser than the outer layer portions.

16. The multilayer ceramic electronic component according to claim 1, wherein the plurality of internal electrode layers are located at equal or substantially equal intervals in the lamination direction.

17. The multilayer ceramic electronic component according to claim 1, wherein each of the pair of external electrodes includes a base electrode layer and a plating layer provided on the base electrode layer.

\* \* \* \* \*